United States Patent
Iwama

(10) Patent No.: US 7,486,448 B2
(45) Date of Patent: Feb. 3, 2009

(54) ZOOM LENS AND IMAGE PICKUP APPARATUS

(75) Inventor: Rei Iwama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 11/854,492

(22) Filed: Sep. 12, 2007

(65) Prior Publication Data

US 2008/0062532 A1  Mar. 13, 2008

(30) Foreign Application Priority Data

Sep. 13, 2006  (JP)  ............................. 2006-247835

(51) Int. Cl.
*G02B 15/14* (2006.01)
(52) U.S. Cl. .................... 359/689; 359/686; 359/680
(58) Field of Classification Search ............. 359/686, 359/689, 680
See application file for complete search history.

(56) References Cited

U.S. PATENT DOCUMENTS

| | | | |
|---|---|---|---|
| 5,009,491 A | 4/1991 | Hata | |
| 5,078,481 A * | 1/1992 | Nakayama et al. | 359/680 |
| 5,272,566 A * | 12/1993 | Aoki | 359/686 |
| 5,764,421 A * | 6/1998 | Shimizu et al. | 359/689 |
| 6,124,984 A * | 9/2000 | Shibayama et al. | 359/689 |
| 6,498,687 B1 | 12/2002 | Sekita | |
| 6,545,819 B1 | 4/2003 | Nanba | |
| 6,646,815 B2 * | 11/2003 | Nobe | 359/689 |
| 6,822,808 B2 | 11/2004 | Nanba | |
| 6,862,143 B2 | 3/2005 | Hoshi et al. | |
| 6,999,242 B2 | 2/2006 | Nanba | |
| 7,023,625 B2 | 4/2006 | Nanba | |
| 7,075,733 B2 * | 7/2006 | Itoh | 359/689 |
| 7,113,347 B2 | 9/2006 | Nanba | |
| 7,113,348 B2 | 9/2006 | Nanba | |
| 7,227,701 B2 | 10/2006 | Nanba | |
| 7,215,483 B2 | 5/2007 | Sekita | |
| 7,227,696 B1 * | 6/2007 | Nanba | 359/682 |
| 2005/0200972 A1 * | 9/2005 | Nose et al. | 359/689 |
| 2005/0259334 A1 | 11/2005 | Sekita | |
| 2005/0280902 A1 * | 12/2005 | Itoh | 359/689 |
| 2006/0114574 A1 * | 6/2006 | Sekita | 359/689 |
| 2007/0053072 A1 * | 3/2007 | Nanba | 359/689 |

FOREIGN PATENT DOCUMENTS

| | | |
|---|---|---|
| JP | 2003-156686 | 5/2003 |
| JP | 2004-61675 | 2/2004 |
| JP | 2005-331641 | 12/2005 |
| JP | 2006-84829 | 3/2006 |

* cited by examiner

*Primary Examiner*—Ricky L Mack
*Assistant Examiner*—James R Greece
(74) *Attorney, Agent, or Firm*—Canon USA Inc. IP Division

(57) ABSTRACT

A zoom lens includes, in order from an object side to an image side, first, second, and third lens units having negative, positive, and positive refractive power, respectively. The zoom lens performs zooming by varying distances between the lens units. The second lens unit includes a first lens subunit composed of positive and negative lens elements, and a second lens subunit arranged on the image side of the first lens subunit and composed of positive and negative lens elements. The following conditions are satisfied:

$\nu 1n < 29$, $\nu 2n < 30$, $18 < \nu 1p - \Theta 1n < 35$, and $26 < \nu 2p - \nu 2n < 35$, where $\nu 1p$ and $\nu 1n$ respectively represent Abbe numbers of materials of the positive and negative lens elements of the first lens subunit, and $\nu 2p$ and $\nu 2n$ respectively represent Abbe numbers of materials of the positive and negative lens elements of the second lens subunit.

23 Claims, 13 Drawing Sheets

ZOOM LENS AND IMAGE PICKUP APPARATUS

BACKGROUND OF THE INVENTION

1. Field of the Invention

The present invention relates to zoom lenses.

2. Description of the Related Art

Recently, for an image pickup apparatus or a camera (e.g., a video camera or digital still camera) using a solid-state image pickup element, there have been demands for a compact zoom lens having high optical performance.

In a camera of such type, various optical members, such as a low-pass filter and a color correction filter, are disposed between the rearmost lens element and a solid-state image pickup element. Therefore, it has been demanded that a zoom lens for such a camera has a relatively long back focus. Examples of optical systems having a long back focus include a negative lead type zoom lens in which a lens unit having negative refractive power is arranged at the front.

For a camera using a solid-state image pickup element for color images, it has been demanded that a zoom lens has good telecentric characteristics on the image side so as to avoid color shading.

There is known a compact three-unit zoom lens that includes, in order from the object side to the image side, a first lens unit having negative refractive power, a second lens unit having positive refractive power, and a third lens unit having positive refractive power, and is telecentric on the image side (see, e.g., U.S. Pat. Nos. 6,545,819 and 6,498,687).

Also, there is known a three-unit zoom lens of this type in which all lens units move during zooming and includes a cemented lens component in a second lens unit to correct chromatic aberrations (see, e.g., U.S. Patent Application No. 2005/259334 and U.S. Pat. No. 7,215,483).

With recent developments in high-performance image pickup elements, there have been strong demands for a compact and high-performance zoom lens for video cameras, digital cameras, and the like. To achieve a thin image pickup apparatus, a so-called retractable zoom lens in which distances between lens units are reduced in a non-photographing mode is used. Additionally, it is necessary to reduce the thickness of lens units to achieve a thinner image pickup apparatus.

In the three-unit zoom lenses described above, the second lens unit serves as a main magnification-varying lens unit which primarily performs a magnification varying operation. Therefore, to achieve high optical performance throughout the entire zoom range, it is necessary to reduce, in the second lens unit, variations in aberration (in particular, chromatic aberration) during zooming. That is, to reduce the size of the entire zoom lens system and achieve high optical performance throughout the entire zoom range in the three-unit zoom lens, it is important for the second lens unit serving as a main magnification-varying lens unit to provide an appropriate lens configuration. Additionally, it is important to select appropriate materials for forming respective lens elements constituting the second lens unit, thereby reducing variations in chromatic aberration associated with zooming.

SUMMARY OF THE INVENTION

The present invention is directed to a zoom lens that is compact and capable of providing high optical performance throughout the entire zoom range, and is also directed to an image pickup apparatus including the zoom lens.

According to an aspect of the present invention, a zoom lens includes, in order from an object side to an image side, a first lens unit having negative refractive power, a second lens unit having positive refractive power, and a third lens unit having positive refractive power. The zoom lens performs zooming by varying distances between the lens units. The second lens unit includes a first lens subunit composed of a positive lens element and a negative lens element, and a second lens subunit arranged on the image side of the first lens subunit and composed of a positive lens element and a negative lens element. The following conditions are satisfied:

$$v1n < 29 \quad (1)$$

$$v2n < 30 \quad (2)$$

$$18 < v1p - v1n < 35 \quad (3)$$

$$26 < v2p - v2n < 35 \quad (4)$$

where $v1p$ and $v1n$ are Abbe numbers of materials of the positive lens element and the negative lens element, respectively, of the first lens subunit, and $v2p$ and $v2n$ are Abbe numbers of materials of the positive lens element and the negative lens element, respectively, of the second lens subunit.

Further features of the present invention will become apparent from the following description of exemplary embodiments with reference to the attached drawings.

DESCRIPTION OF THE EXEMPLARY EMBODIMENTS

Exemplary embodiments of a zoom lens of the present invention and an image pickup apparatus including the zoom lens will now be described.

Figure 1:
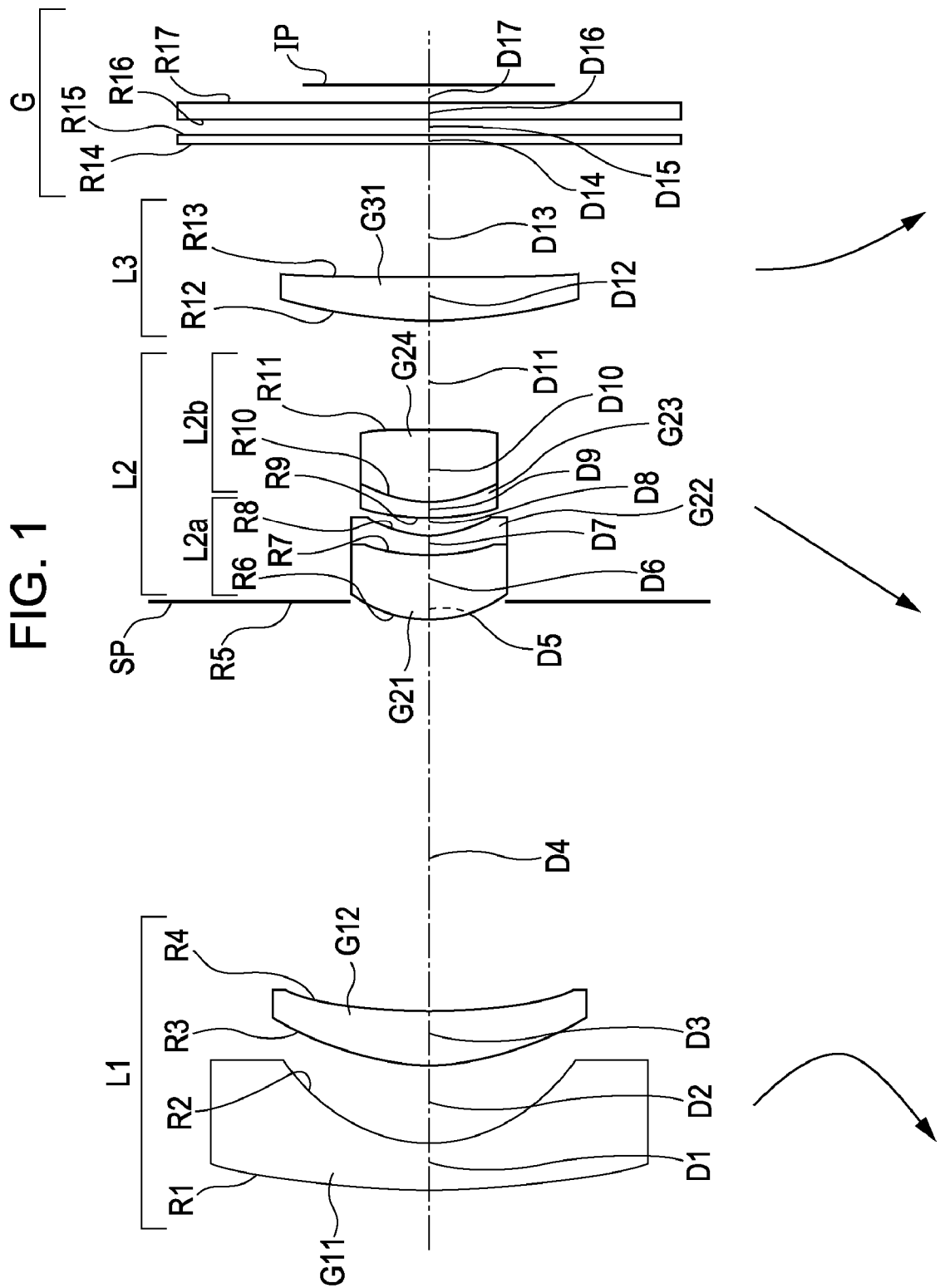
FIG. 1 is an optical cross-sectional view of a zoom lens according to a first exemplary embodiment of the present invention.
Figure 2:
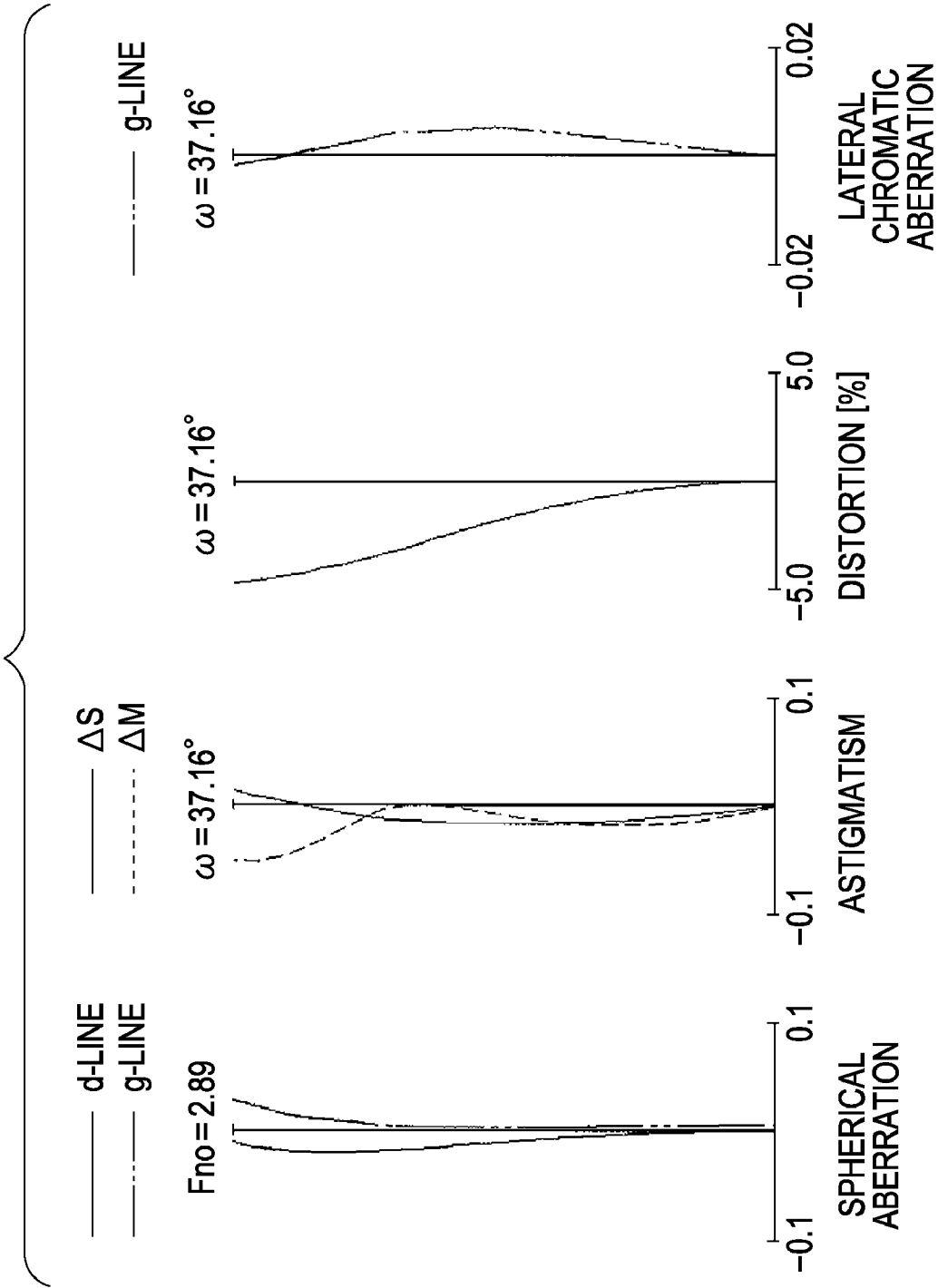
FIG. 2 shows aberration curves at the wide-angle end of the zoom lens according to the first exemplary embodiment.
Figure 3:
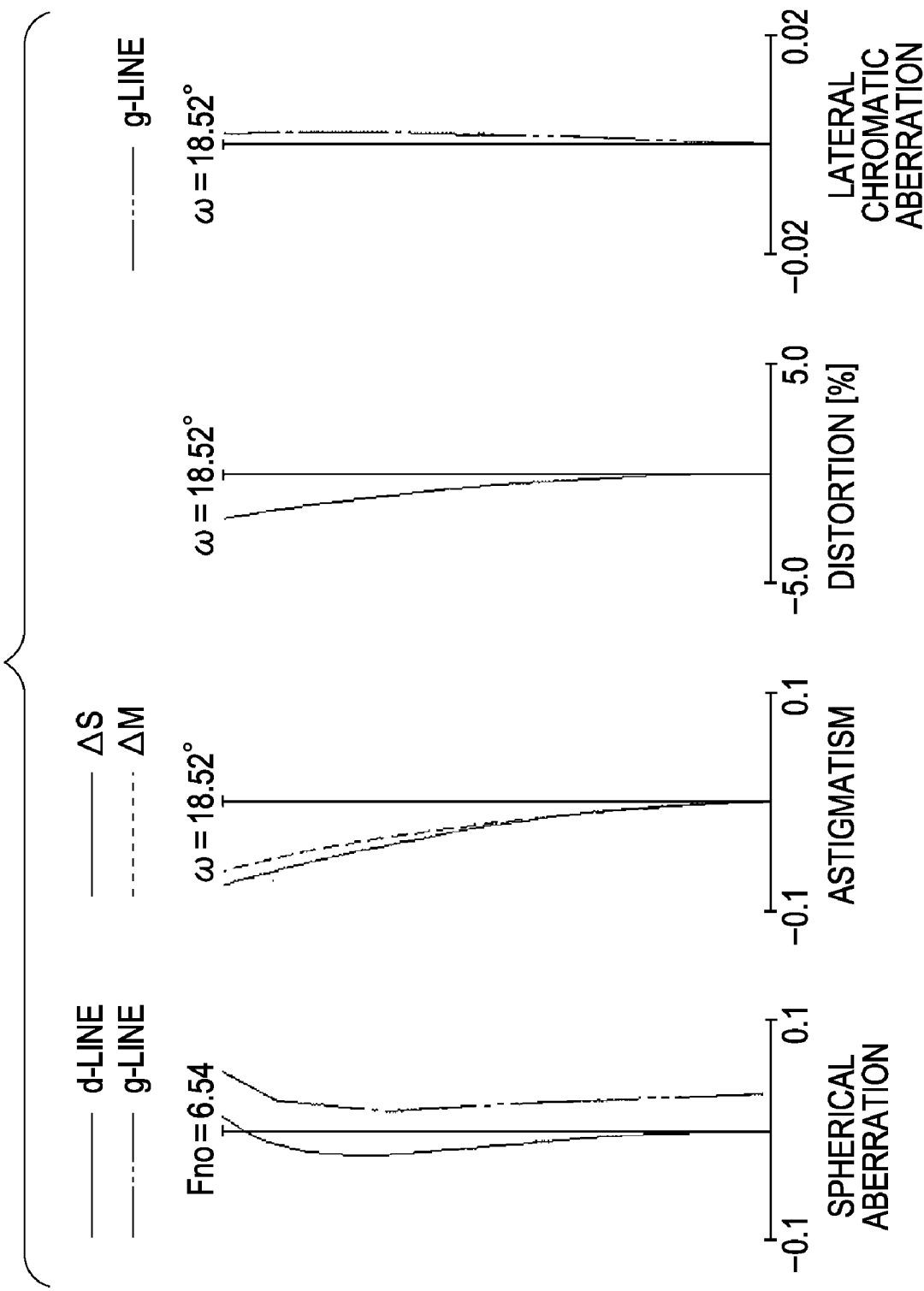
FIG. 3 shows aberration curves at the middle zooming position of the zoom lens according to the first exemplary embodiment.
Figure 4:
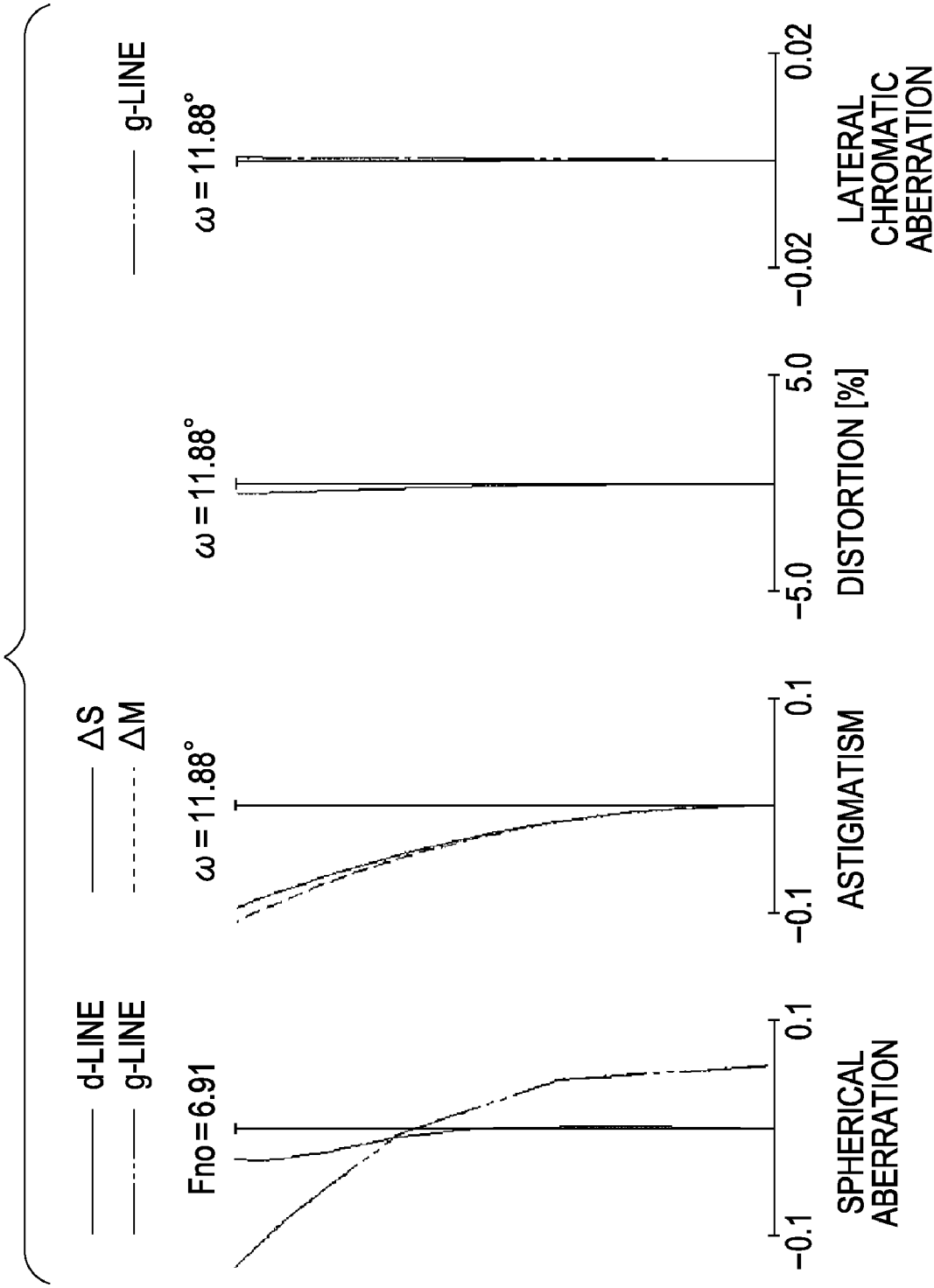
FIG. 4 shows aberration curves at the telephoto end of the zoom lens according to the first exemplary embodiment.

FIG. 1 is a cross-sectional view at the wide-angle end (short focal length end) of a zoom lens according to the first exemplary embodiment of the present invention. FIG. 2, FIG. 3, and FIG. 4 show aberration curves at the wide-angle end, middle zooming position, and telephoto end (long focal length end), respectively, of the zoom lens of the first exemplary embodiment. The zoom lens of the first exemplary embodiment has a zoom ratio of about 3.6 and an aperture ratio of about 2.9 to 5.9.

Figure 5:
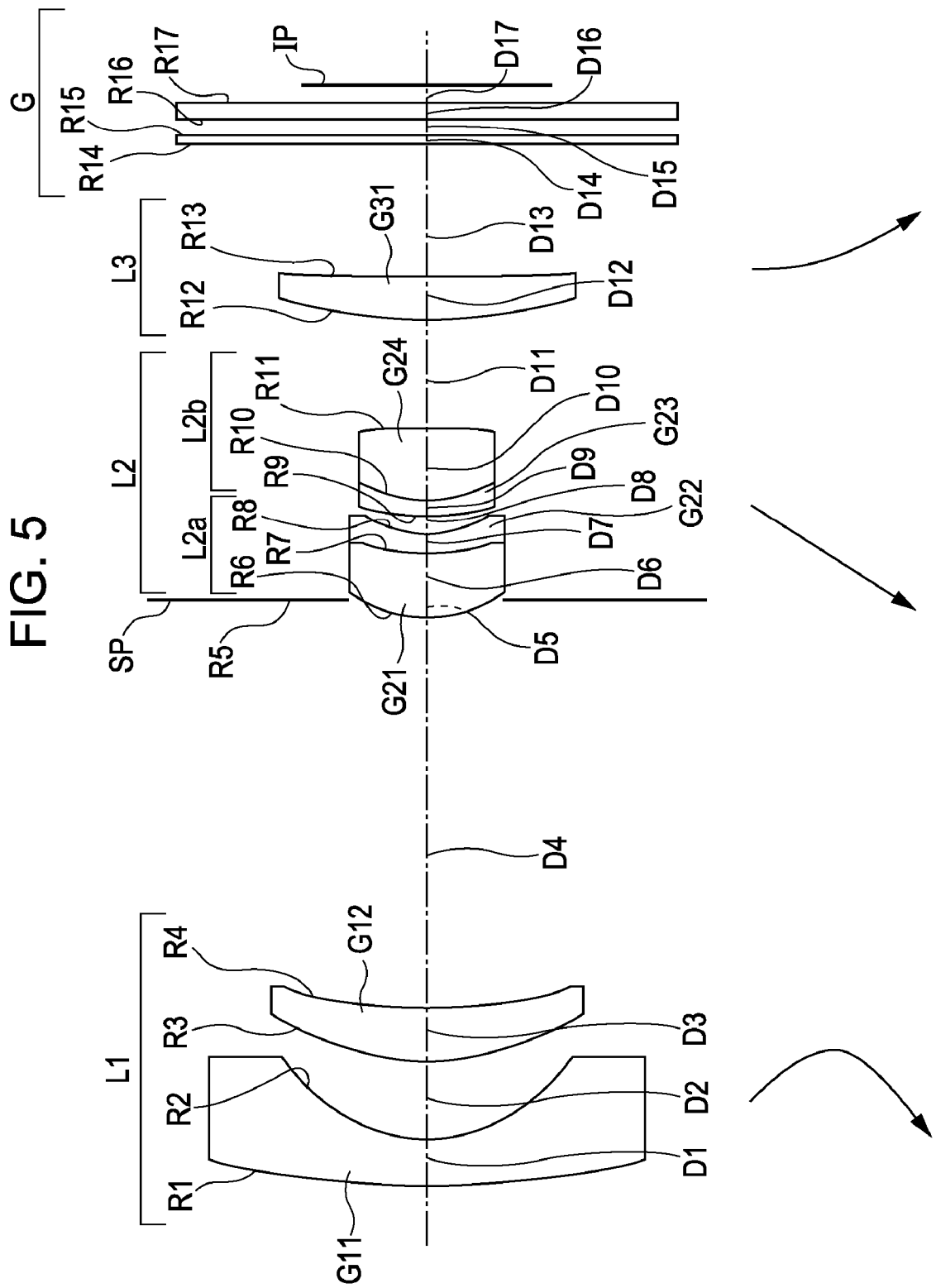
FIG. 5 is an optical cross-sectional view of a zoom lens according to a second exemplary embodiment of the present invention.
Figure 6:
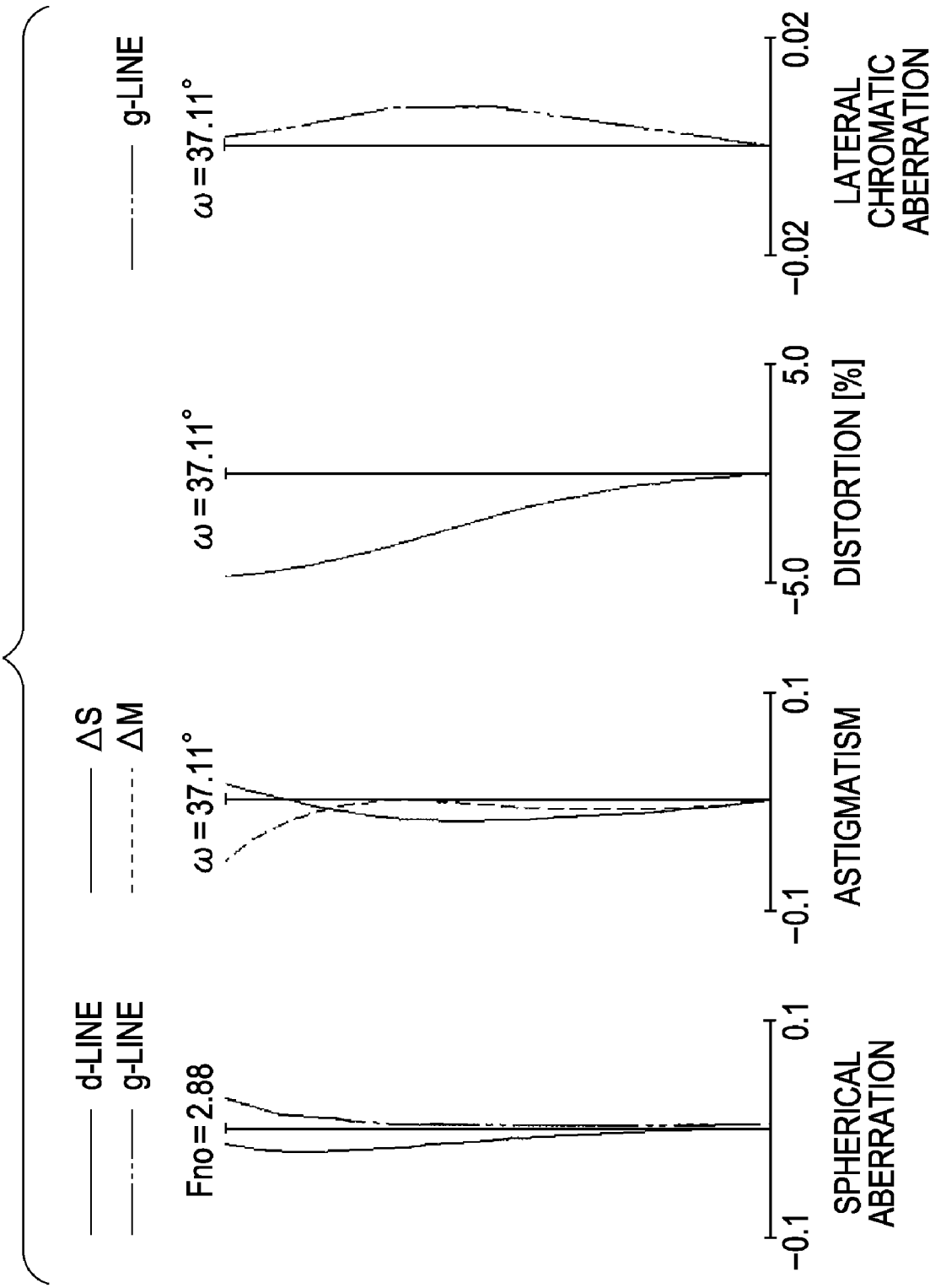
FIG. 6 shows aberration curves at the wide-angle end of the zoom lens according to the second exemplary embodiment.
Figure 7:
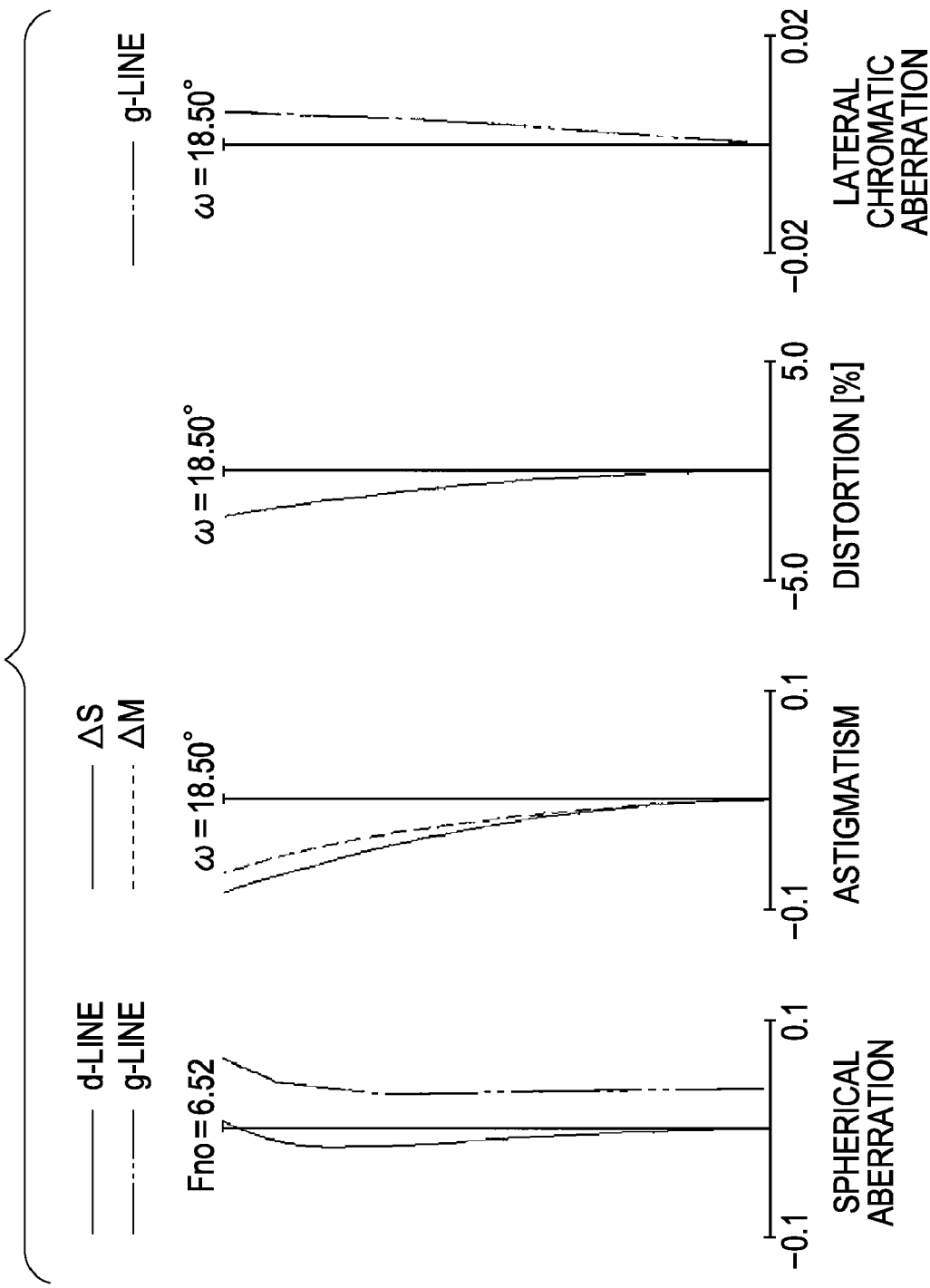
FIG. 7 shows aberration curves at the middle zooming position of the zoom lens according to the second exemplary embodiment.
Figure 8:
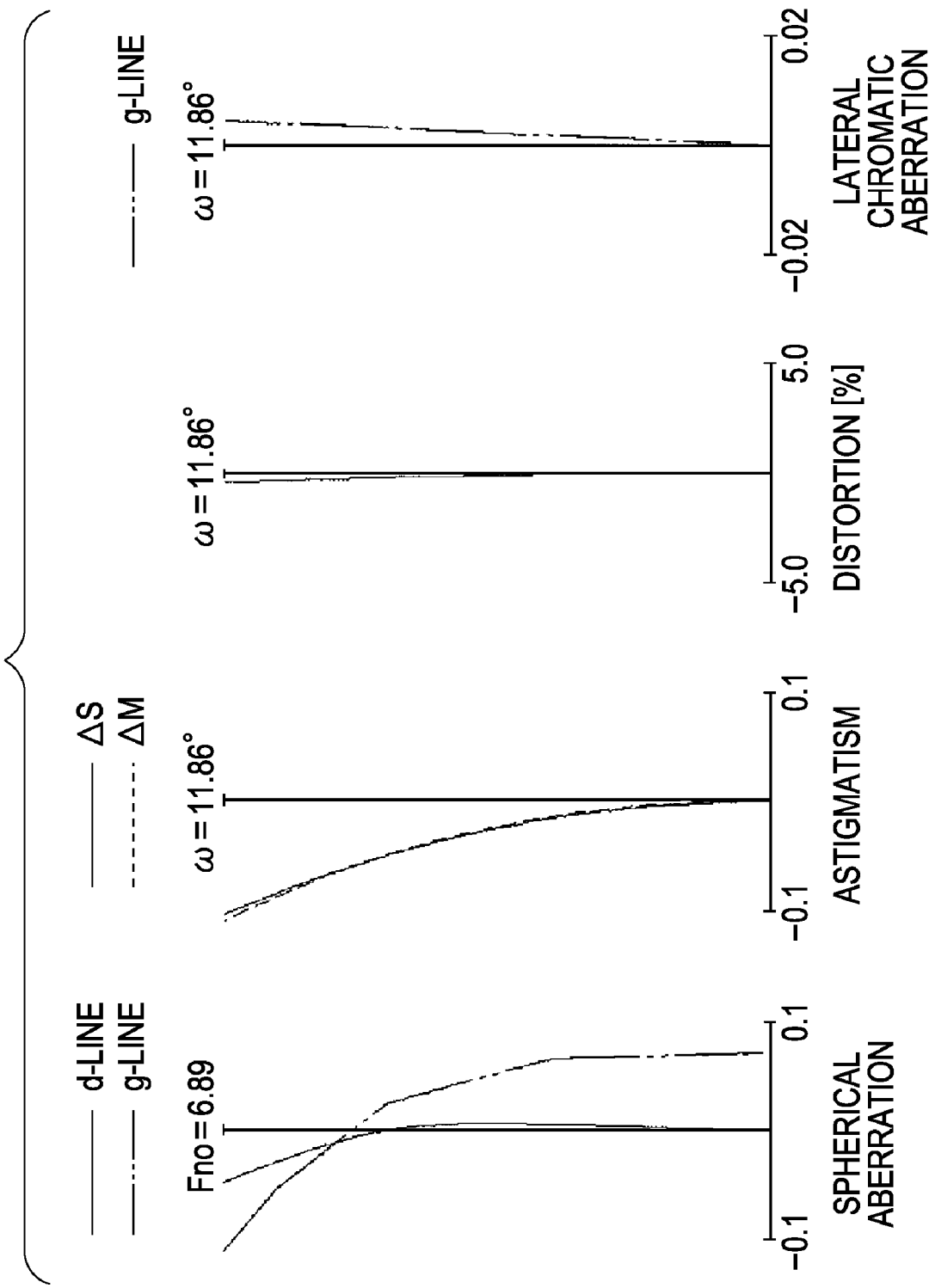
FIG. 8 shows aberration curves at the telephoto end of the zoom lens according to the second exemplary embodiment.

FIG. 5 is a cross-sectional view at the wide-angle end of a zoom lens according to the second exemplary embodiment of the present invention. FIG. 6, FIG. 7, and FIG. 8 show aberration curves at the wide-angle end, middle zooming position, and telephoto end, respectively, of the zoom lens of the second exemplary embodiment. The zoom lens of the second exemplary embodiment has a zoom ratio of about 3.6 and an aperture ratio of about 2.9 to 5.9.

Figure 9:
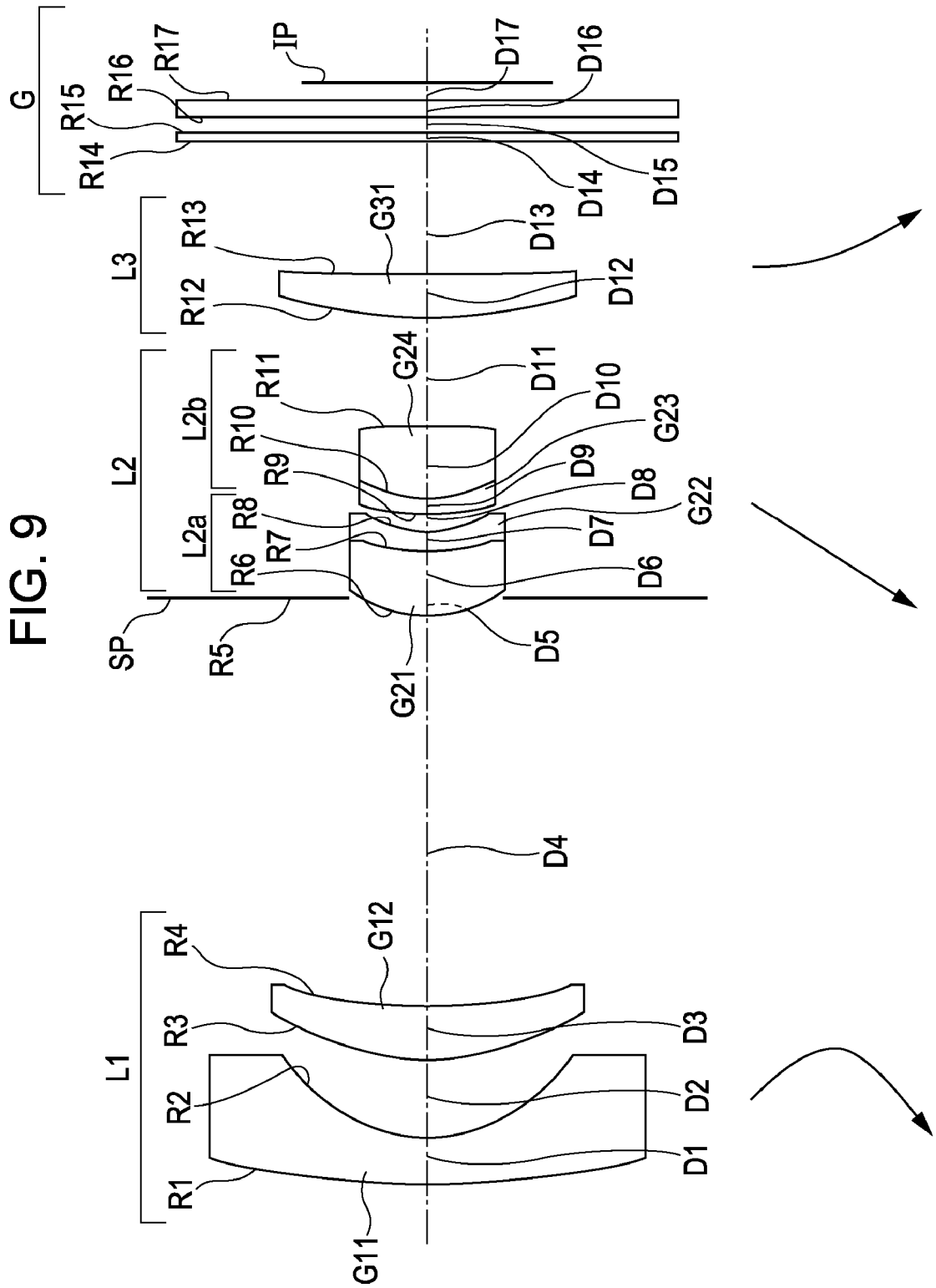
FIG. 9 is an optical cross-sectional view of a zoom lens according to a third exemplary embodiment of the present invention.
Figure 10:
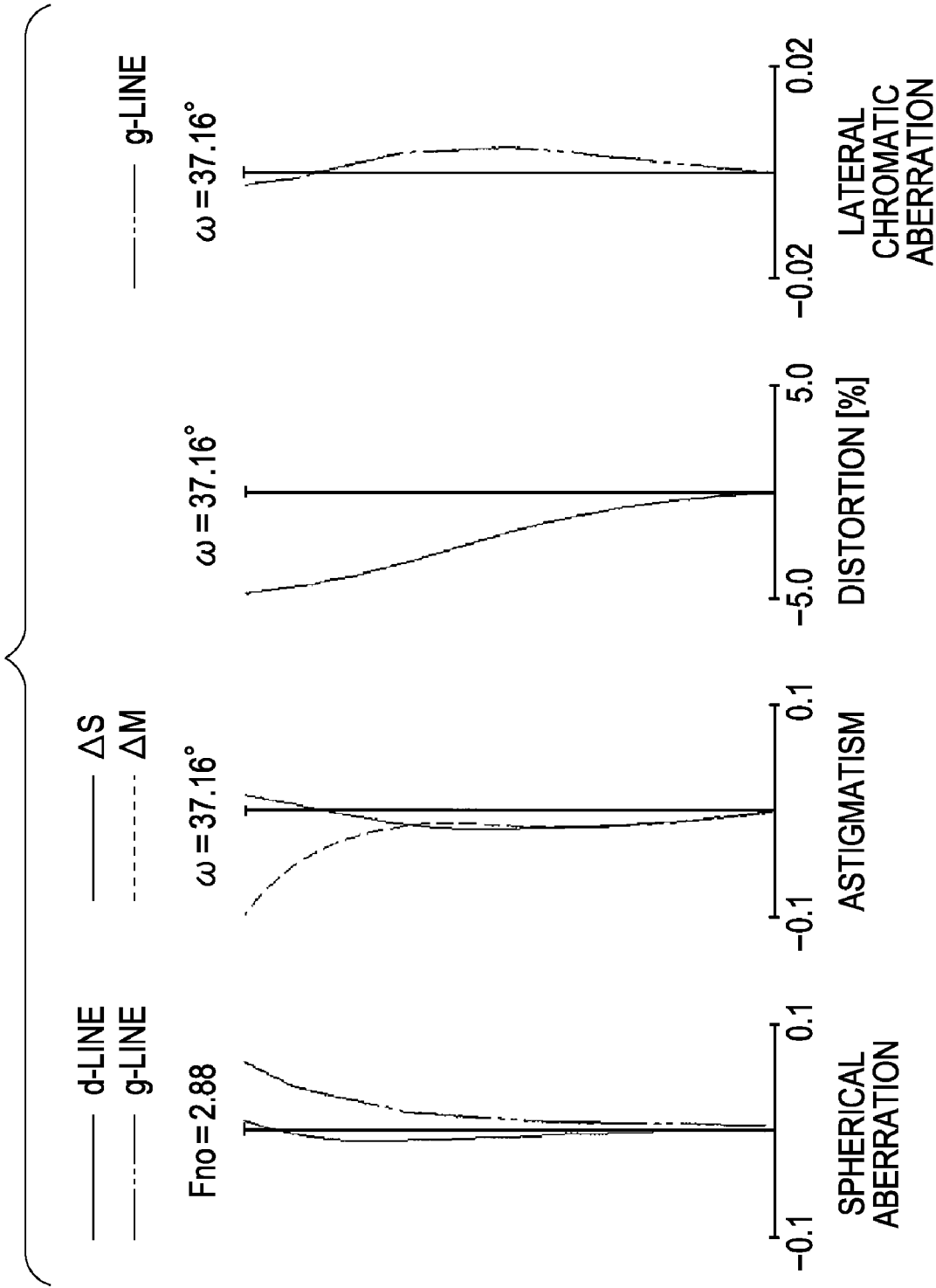
FIG. 10 shows aberration curves at the wide-angle end of the zoom lens according to the third exemplary embodiment.
Figure 11:
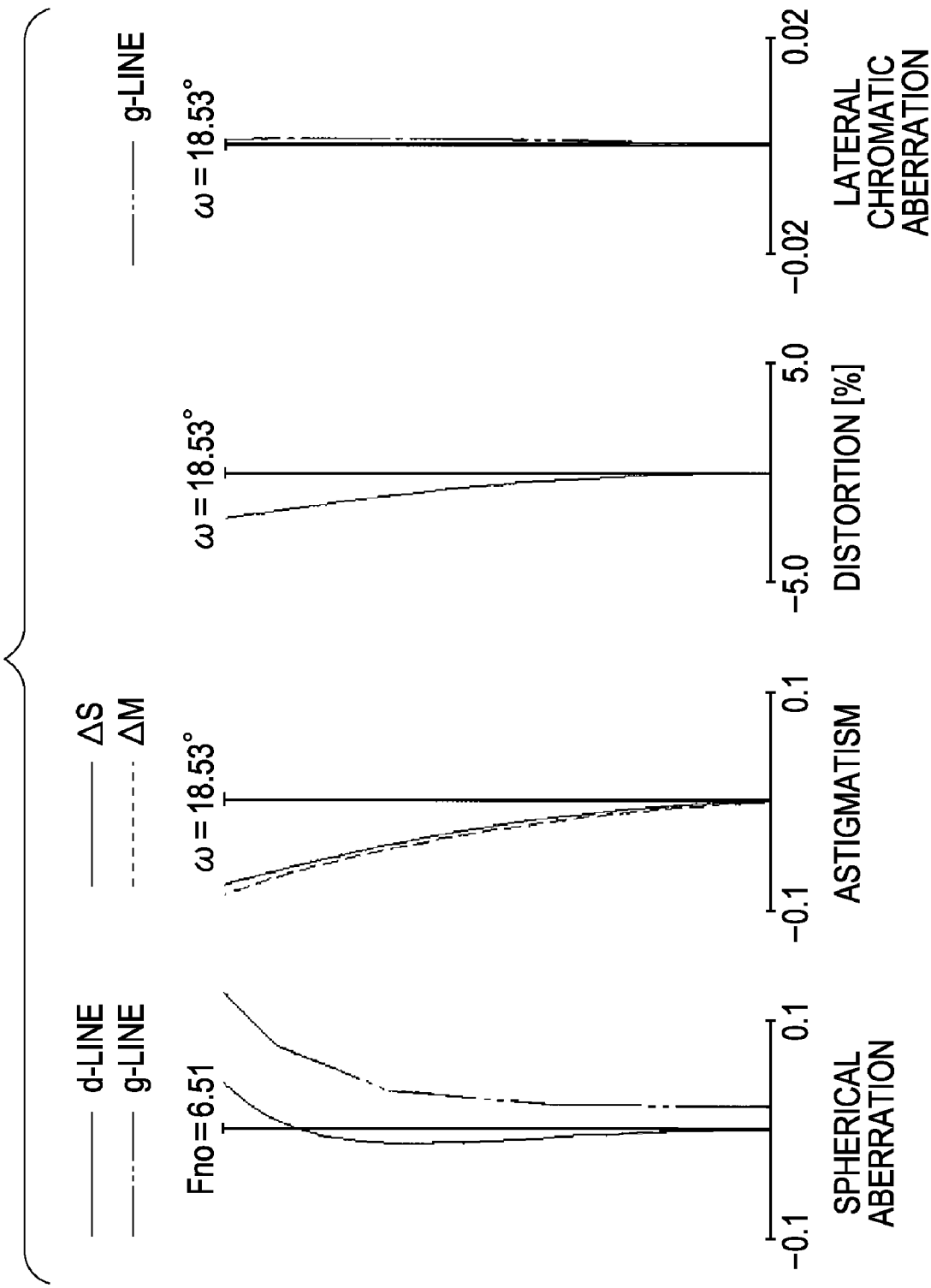
FIG. 11 shows aberration curves at the middle zooming position of the zoom lens according to the third exemplary embodiment.
Figure 12:
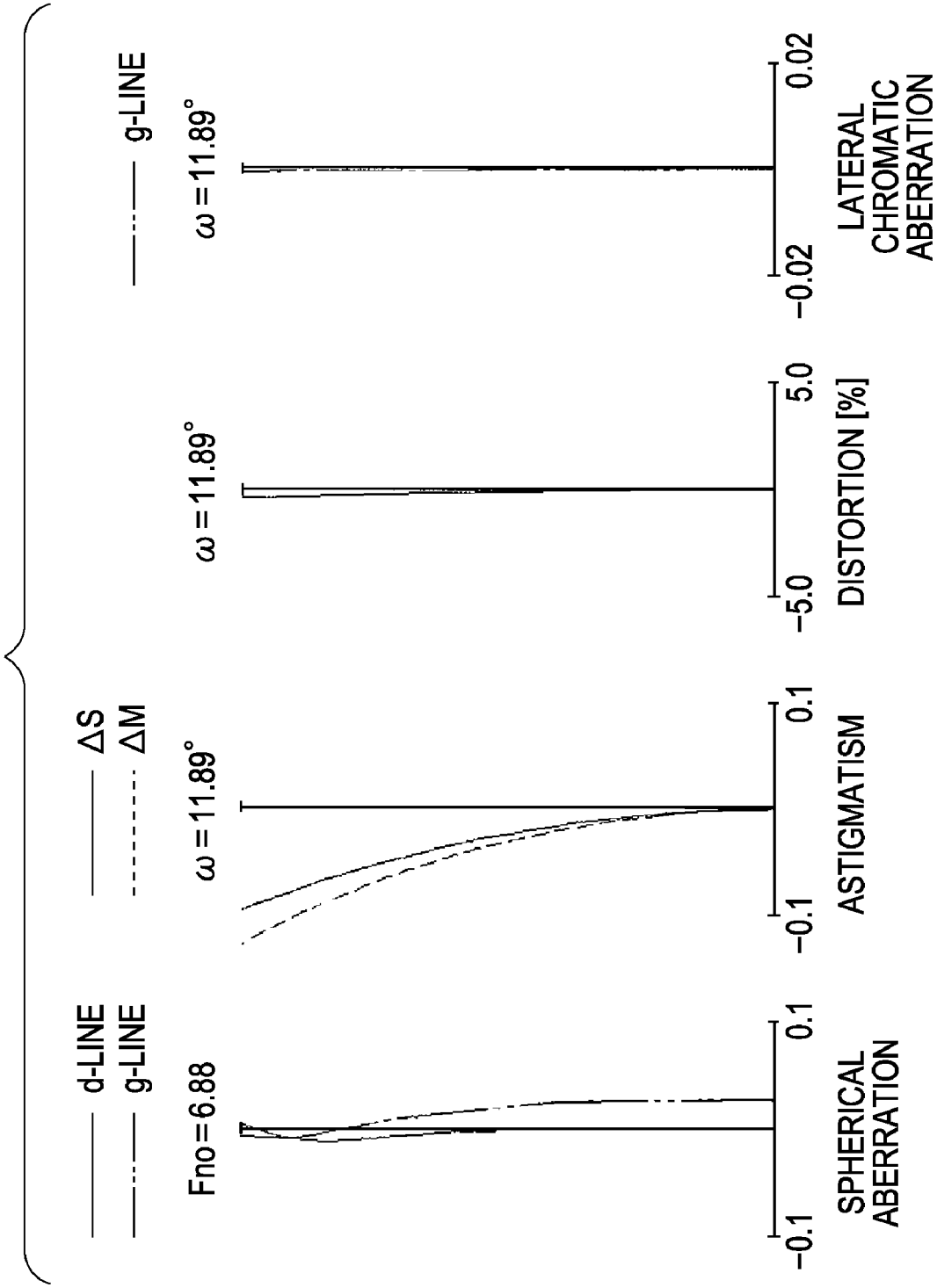
FIG. 12 shows aberration curves at the telephoto end of the zoom lens according to the third exemplary embodiment.

FIG. 9 is a cross-sectional view at the wide-angle end of a zoom lens according to the third exemplary embodiment of the present invention. FIG. 10, FIG. 11, and FIG. 12 show aberration curves at the wide-angle end, middle zooming position, and telephoto end, respectively, of the zoom lens of the third exemplary embodiment. The zoom lens of the third exemplary embodiment has a zoom ratio of about 3.6 and an aperture ratio of about 2.9 to 5.9.

Figure 13:
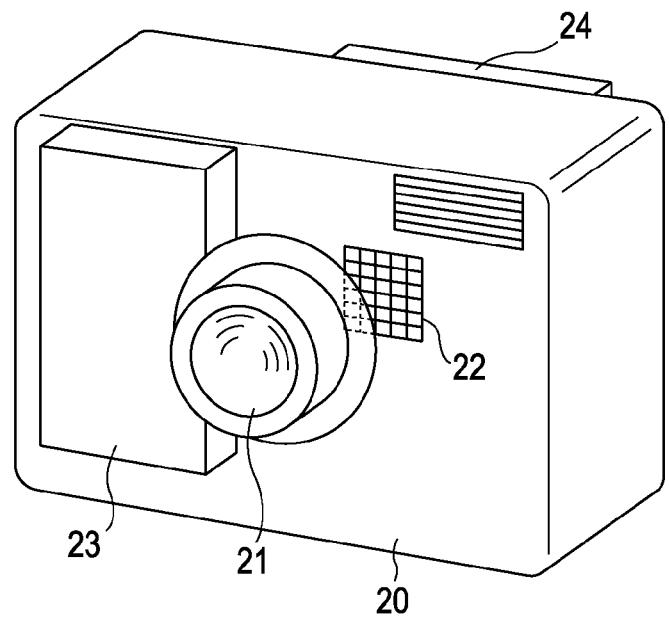
FIG. 13 illustrates a main part of an image pickup apparatus according to at least one exemplary embodiment of the present invention.

FIG. 13 illustrates a main part of a digital still camera including a zoom lens according to at least one exemplary embodiment of the present invention.

The zoom lens in each exemplary embodiment is an imaging lens system for an image pickup apparatus. In the cross-sectional views of FIGS. 1, 5, and 9, the object (front) side is on the left and the image (rear) side is on the right.

The cross-sectional views of FIGS. 1, 5, and 9 each illustrate a first lens unit L1 of negative refractive power (optical power=reciprocal of focal length), a second lens unit L2 of positive refractive power, a third lens unit L3 of positive refractive power, an F-number determining member SP, an optical block G, and an image plane IP.

The F-number determining member SP (hereinafter also referred to as "aperture stop") serves as an aperture stop that determines (limits) an open F-number (Fno) beam. The optical block G corresponds to an optical filter, a faceplate, a crystal low-pass filter, an infrared cut filter, or the like. When the zoom lens is used as an imaging optical system for a video camera or a digital still camera, the image plane IP is an image pickup surface of a solid-state image pickup element (photoelectric conversion element), such as a charge-coupled device (CCD) sensor or a complementary metal oxide semiconductor (CMOS) sensor.

In the aberration curves (FIGS. 2 to 4, FIGS. 6 to 8, and FIGS. 10 to 12), "d" and "g" represent a d-line and a g-line, respectively; and ΔM and ΔS represent a meridional image plane and a sagittal image plane, respectively. A lateral chromatic aberration is indicated by the g-line.

In each exemplary embodiment described below, a wide-angle end and a telephoto end are zoom positions when a magnification-varying lens unit (second lens unit L2) is located at both ends of a mechanically movable range along the optical axis.

In the zoom lens of each exemplary embodiment, during zooming from the wide-angle end to the telephoto end, the first lens unit L1 substantially reciprocates in a locus convex toward the image side, the second lens unit L2 monotonously moves toward the object side, and the third lens unit L3 moves toward the image side.

During zooming, the lens units L1 to L3 move such that the distance between the first lens unit L1 and the second lens unit L2 at the telephoto end is smaller than that at the wide-angle end, while the distance between the second lens unit L2 and the third lens unit L3 at the telephoto end is greater than that at the wide-angle end.

In the zoom lens of each exemplary embodiment, the second lens unit L2 is moved toward the object side during magnification change from the wide-angle end to the telephoto end. In the zoom lens of each exemplary embodiment, magnification is varied primarily by moving the second lens unit L2, while displacement of an image point associated with the magnification change is corrected by reciprocating the first lens unit L1 (in a locus convex toward the image side). At the same time, magnification is varied by moving the third lens unit L3 serving as a secondary magnification-varying lens unit. This makes an increase in refractive power of each lens unit smaller than the case where magnification is varied by moving only a single lens unit.

Figure 14:
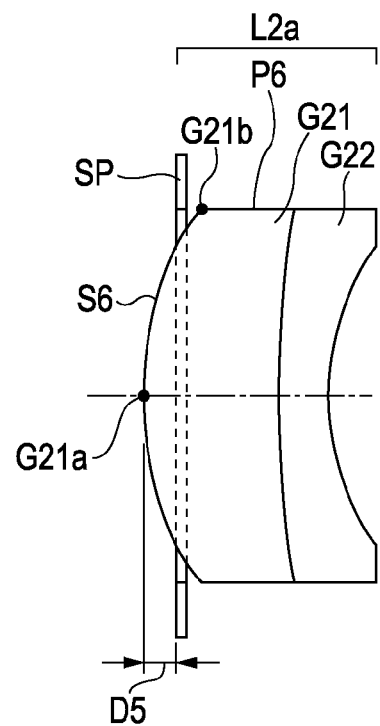
FIG. 14 illustrates an F-number stop.

FIG. 14 illustrates an exemplary arrangement of the F-number determining member SP. As illustrated in FIG. 14, the F-number determining member SP is located, in the direction of the optical axis, between a vertex G21a and an intersection point G21b. The vertex G21a is located on the object side of a 21st lens element G21 that is closest, in the second lens unit L2, to the object. The intersection point G21b is a point at which a surface S6 on the object side of the 21st lens element G21 and a rim (edge) P6 intersect.

When the F-number determining member SP is thus arranged in the second lens unit L2 and moved together with the second lens unit L2 during zooming, the distance between an entrance pupil and the first lens unit L1 at the wide-angle end is reduced.

Since this arrangement of the F-number determining member SP can reduce the distance between the first lens unit L1 and the second lens unit L2 at the telephoto end, it is possible to ensure a sufficient amount of movement of the second lens unit L2 toward the object side during zooming. This prevents an increase in the overall length of the zoom lens at the telephoto end while achieving a high zooming ratio.

For adjusting the quantity of light, an aperture unit capable of providing a small aperture, an insertion/removal unit for a neutral density (ND) filter, or the like may be provided on the image side of the second lens unit L2.

Each lens unit will now be described.

Since the first lens unit L1 is a lens unit having negative refractive power, an image plane variation associated with field angle characteristics can be effectively corrected. By increasing the negative refractive power of the first lens unit L1, a more compact zoom lens with a wider angle can be achieved.

Since the second lens unit L2 is a lens unit having positive refractive power, spherical aberration and astigmatism can be effectively corrected. By increasing the positive refractive power of the second lens unit L2, a more compact zoom lens with a wider angle can be achieved.

The positive refractive power of the second lens unit L2 is divided between a first lens subunit L2a and a second lens subunit L2b. The first lens subunit L2a of positive refractive power and the second lens subunit L2b of positive refractive power are both cemented lens components. Since this increases the curvature radius of the surface of each cemented lens component, the thickness of the second lens unit L2 in the direction of the optical axis can be reduced.

Since the third lens unit L3 is a lens unit having positive refractive power, the third lens unit L3 serves as a field lens for achieving good telecentric characteristics on the image side. This makes it easy to apply the zoom lens to an image pickup apparatus using a solid-state image pickup element.

The third lens unit L3 is moved toward the image side during zooming from the wide-angle end to the telephoto end. However, in the zoom lens of each exemplary embodiment, the third lens unit L3 does not necessarily have to be moved for zooming. If the third lens unit L3 is not moved for zooming, a mechanical member, an actuator, and the like that are required for driving become unnecessary.

Next, specific features of the lens configuration of each lens unit will be described.

The first lens unit L1 includes, in order from the object side to the image side, a negative 11th lens element G11 of negative refractive power and a positive 12th lens element G12 of positive refractive power. The 11th lens element G11 is a meniscus lens element having a concave surface on the image side, while the 12th lens element G12 is a meniscus lens element having a convex surface on the object side. This configuration in which the first lens unit L1 is composed of two lens elements allows effective correction of aberrations while contributing to the reduced size of the entire zoom lens system. This configuration particularly contributes to the reduced retracted length of the entire zoom lens.

In the first lens unit L1, since the amount of refraction of an off-axis ray is large at the wide-angle end, off-axis aberrations, particularly astigmatism and distortion aberration, tend to occur.

Therefore, in each exemplary embodiment, the first lens unit L1 includes the negative 11th lens element G11 and the positive 12th lens element G12 so as to reduce the lens diameter on the side closest to the object. Since the negative 11th lens element G11 is made of high dispersion glass material having a high refractive index and the positive 12th lens element G12 is made of low dispersion glass material having a low refractive index, effective correction of spherical aberration and longitudinal and lateral chromatic aberrations can be achieved throughout the entire zoom range.

The negative 11th lens element G11 has on the object side an aspheric surface in which positive refractive power increases toward the periphery, and has on the image side an aspheric surface in which negative refractive power decreases toward the periphery. Therefore, astigmatism and distortion aberrations can be corrected in a balanced manner. At the same time, since the first lens unit L1 is composed of as small as two lens elements, the size of the entire zoom lens can be reduced.

Additionally, by increasing the negative refractive power of the first lens unit L1 to satisfy condition (5) described below, it is possible to prevent an increase in diameter of the front lens element associated with an increase in field angle.

In the zoom lens of each exemplary embodiment, the second lens unit L2 includes the first lens subunit L2a of positive refractive power and the second lens subunit L2b of positive refractive power. This not only distributes an increase in refractive power of the second lens unit L2 associated with an increase in field angle, but also reduces eccentricity sensitivity when the second lens unit L2 performs image stabilization. Eccentricity sensitivity is the amount of eccentricity of an image forming position with respect to the amount of eccentricity of a lens unit (here, the second lens unit L2) having an image stabilizing function. That is, eccentricity sensitivity can be obtained by dividing the amount of eccentricity of an image forming position by the amount of eccentricity of the second lens unit L2.

The first lens subunit L2a includes, in order from the object side to the image side, the positive 21st lens element G21 and a negative 22nd lens element G22. The 21st lens element G21 is a meniscus lens element having a convex surface on the object side, while the 22nd lens element G22 is a meniscus lens element having a convex surface on the object side.

The second lens subunit L2b includes, in order from the object side to the image side, a negative 23rd lens element G23 and a positive 24th lens element G24. The 23rd lens element G23 is a meniscus lens element having a convex surface on the object side, while the 24th lens element G24 is a lens element having convex surfaces on both sides.

The first lens subunit L2a and the second lens subunit L2b may be configured in any manner as long as they are cemented lens components, each being composed of a positive lens element and a negative lens element. The order of arrangement of the positive and negative lens elements may be reversed. The first lens subunit L2a may be a cemented lens component composed of a positive lens element having convex surfaces on both sides and a negative lens element having concave surfaces on both sides.

The first lens subunit L2a is configured such that the positive 21st lens element G21 is arranged on the object side, the refractive angle of an off-axis ray emerging from the first lens unit L1 is reduced, and off-axis aberrations do not occur.

The positive 21st lens element G21 arranged closest to the object is a lens element through which an on-axis ray passes at the highest level. The 21st lens element G21 primarily relates to correction of spherical aberration and coma aberration.

In each exemplary embodiment, the positive 21st lens element G21 has on the object side an aspheric surface in which positive refractive power decreases with distance from the center to periphery of the 21st lens element G21. This allows effective correction of spherical aberration and coma aberration.

Additionally, the positive 21st lens element G21 has a convex surface directed toward the object, while the positive 24th lens element G24 of the second lens subunit L2b has convex surfaces on both sides. This allows effective correction of spherical aberration and astigmatism.

In each of the first lens subunit L2a and the second lens subunit L2b, Abbe numbers of glass materials of two lens elements are greatly different. This allows effective correction of longitudinal chromatic aberration throughout the entire zoom range.

By appropriately defining the difference in Abbe number so as to satisfy conditions (3) and (4) described below, effective correction of chromatic aberration can be made within each lens subunit.

By increasing refractive power of the second lens unit L2, it is possible to reduce the stroke thereof during a magnification varying operation and the retracted length of the zoom lens.

The second lens unit L2 moves to have a component perpendicular to the axis so that image blurring caused by camera shake can be corrected (i.e., image stabilization can be performed).

Image stabilization is performed such that eccentricity sensitivity at this point satisfies conditions (13) and (14) described below.

The third lens unit L3 serves as a field lens which ensures telecentricity. To reduce axial lens thickness, the third lens unit L3 is composed of a single positive lens element (31st lens element G31).

The third lens unit L3 is a focusing lens unit that moves from the image side to the object side for focusing from an object at infinity to an object at a close distance. Focusing speed is increased by appropriately defining position sensitivity (i.e., focusing sensitivity) of the third lens unit L3 such that it satisfies conditions (11) and (12) described below.

Conditions (11) and (12) appropriately define the ratio of the moving distance of a focus position to that of the third lens unit L3, which is a focusing lens unit. Specifically, conditions (11) and (12) appropriately define the value of (moving distance of focus position)/(moving distance of third lens unit L3) at the wide-angle end and telephoto end.

In each of the exemplary embodiments described above, three lens units are moved during zooming. Alternatively, two lens units (e.g., the first and second lens units L1 and L2, first and third lens units L1 and L3, or second and third lens units L2 and L3) may be moved such that the distance between the lens units is varied. Also, for example, a lens unit having small refractive power or a converter lens unit may be further provided on the object side of the first lens unit L1 and/or on the image side of the third lens unit L3.

Thus, in the exemplary embodiments described above, it is possible to provide a zoom lens including three lens units having negative, positive, and positive refractive powers, capable of effectively correcting aberrations throughout the entire zoom range, and having high optical performance. The zoom lens is compact because of its thin lens units, but has good telecentricity and is suitable for a camera using a solid-state image pickup element.

Additionally, in the exemplary embodiments described above, by effectively introducing aspheric surfaces in the lens units, it becomes possible to effectively correct off-axis aberrations (in particular, astigmatism, distortion aberration, and spherical aberration which may occur when the aperture ratio increases).

The zoom lens of each exemplary embodiment should satisfy at least one of the following conditions, each condition corresponding to certain effects achievable by the zoom lens:

$$v1n<29 \quad (1)$$

$$v2n<30 \quad (2)$$

$$18<v1p-v1n<35 \quad (3)$$

$$26<v2p-v2n<35 \quad (4)$$

$$1.5<|f1/fw|<2.5 \quad (5)$$

$$1.5<f2/fw<2.5 \quad (6)$$

$$2.5<f3/\sqrt{(fw \cdot fT)}<4.0 \quad (7)$$

$$-4.0<m2/fw<-2.5 \quad (8)$$

$$-15<(r1\_a+r2\_a)/(r1\_a-r2\_a)<0 \quad (9)$$

$$-1 \leq (r1\_b+r2\_b)/(r1\_b-r2\_b) \leq 0 \quad (10)$$

$$0.3<AW<0.5 \quad (11)$$

$$0.2<AT<0.4 \quad (12)$$

$$0.5<BW<2.5 \quad (13)$$

$$2.0<BT<3.0 \quad (14)$$

where $v1p$ and $v1n$ are Abbe numbers of materials of a positive lens element and a negative lens element, respectively, of the first lens subunit L2a; $v2p$ and $v2n$ are Abbe numbers of materials of a positive lens element and a negative lens element, respectively, of the second lens subunit L2b;

f1, f2, and f3 are focal lengths of the first, second, and third lens units L1, L2, and L3, respectively;

fw and fT are focal lengths of the entire zoom lens system at the wide-angle end and the telephoto end, respectively;

m2 is the amount of movement of the second lens unit L2 during zooming along the optical axis, where the amount of movement is assigned a plus sign or a minus sign depending on whether the second lens unit L2 moves toward the image side or the object side, respectively, during magnification change from the wide-angle end to the telephoto end;

r1_a and r2_a are the curvature radii of surfaces on the object side and the image side, respectively, of a positive lens element of the first lens subunit L2a, when the positive lens element and a negative lens element of the first lens subunit L2a are arranged in order from the object side to the image side;

r1_b and r2_b are the curvature radii of surfaces on the object side and the image side, respectively, of a positive lens element of the second lens subunit L2b, when a negative lens element and the positive lens element of the second lens subunit L2b are arranged in order from the object side to the image side;

AW and AT are position sensitivities of the third lens unit L3 at the wide-angle end and the telephoto end, respectively, and can be expressed as:

$$AW=1-\beta 3w^2$$

$$AT=1-\beta 3T^2$$

where $\beta 3w$ and $\beta 3T$ are lateral magnifications of the third lens unit L3 at the wide-angle end and the telephoto end, respectively; and BW and BT are eccentricity sensitivities of the second lens unit L2 at the wide-angle end and the telephoto end, respectively, and can be expressed as:

$$BW=(1-\beta 2w)\times \beta 3w$$

$$BT=(1-\beta 2T)\times \beta 3T$$

where $\beta 2w$ and $\beta 2T$ are lateral magnifications of the second lens unit L2 at the wide-angle end and the telephoto end, respectively.

In particular, conditions (1), (2), (3), and (4) should be satisfied. The other conditions (5) to (14) are optional expressions that may be satisfied.

The technical meanings of the foregoing conditions will now be described.

Condition (1) defines the Abbe number of material of a negative lens element constituting the first lens subunit L2a, while condition (2) defines the Abbe number of material of a negative lens element constituting the second lens subunit L2b. If the upper limit of condition (1) or (2) is exceeded, it becomes difficult to correct longitudinal and lateral chromatic aberrations due to insufficient dispersion of material of the negative lens element.

Condition (3) defines a difference between the Abbe numbers of materials of two lens elements constituting the first lens subunit L2a, which is a cemented lens component. Condition (4) defines a difference between the Abbe numbers of materials of two lens elements constituting the second lens subunit L2b, which is also a cemented lens component. If the lower limit of condition (3) or (4) is not reached, it is possible that a reduction in longitudinal chromatic aberration at the wide-angle end of the lens subunit is insufficient, because the difference in Abbe number is too small. If the upper limit of condition (3) or (4) is exceeded, lateral chromatic aberration at the telephoto end is excessively corrected, because the difference in Abbe number of the cemented lens component is too large.

Condition (5) defines the refractive power of the first lens unit L1. If the lower limit of condition (5) is not reached, the focal length of the first lens unit L1 is too small, that is, the refractive power of the first lens unit L1 is too large. This results in insufficient correction of distortion aberration. If the upper limit of condition (5) is exceeded, the focal length of the first lens unit L1 is too large, that is, the refractive power of the first lens unit L1 is too small. This results in an increase in the diameter of the front lens element and thus is undesirable.

Condition (6) defines the ratio of the focal length of the second lens unit L2 to that of the entire zoom lens system at the wide-angle end. If the lower limit of condition (6) is not reached, the focal length of the second lens unit L2 is small, that is, the refractive power of the second lens unit L2 is too large. This makes it difficult to effectively correct spherical aberration and longitudinal chromatic aberration. If the upper limit of condition (6) is exceeded, the focal length of the second lens unit L2 is large, that is, the refractive power of the second lens unit L2 is too small. This means that obtaining a desired zoom ratio involves a long stroke of the second lens unit L2. Therefore, it is difficult to reduce the overall length of the zoom lens.

Condition (7) defines the focal length of the third lens unit L3. If the lower limit of condition (7) is not reached, the focal length of the third lens unit L3 is small, that is, the refractive power of the third lens unit L3 is too large. This causes a considerable image plane variation associated with focusing and thus is undesirable. If the upper limit of condition (7) is exceeded, the focal length of the third lens unit L3 is large, that is, the refractive power of the third lens unit L3 is too small. This makes it difficult to ensure telecentricity.

Condition (8) defines the amount of movement of the second lens unit L2 during zooming. If the lower limit of condition (8) is not reached, the amount of movement of the second lens unit L2 is too large. This makes it difficult to reduce the retracted length of the entire zoom lens. If the upper limit of condition (8) is exceeded, the amount of movement of the second lens unit L2 is too small. This means that obtaining a desired zoom ratio involves higher refractive power of the second lens unit L2. Therefore, it is difficult to correct spherical aberration and coma aberration.

Condition (9) defines the shape of the positive 21st lens element G21 of the first lens subunit L2a. If a value is less than −1 in condition (9), the 21st lens element G21 is a meniscus lens element having a convex surface directed toward the object side. If the lower limit of condition (9) is not reached, the meniscus curvature of the 21st lens element G21 is too high. When the 21st lens element G21 has desired refractive power, the curvature of the 21st lens element G21 is too high, which causes spherical aberration to occur. On the other hand, if the curvature of the 21st lens element G21 is lowered, the refractive power of the 21st lens element G21 is weakened, which results in insufficient correction of longitudinal chromatic aberration. If a value is greater than −1 in condition (9), a surface on the image side of the 21st lens element G21 is convex toward the image side. The curvature of the 21st lens element G21 increases as the value increases. If the upper limit of condition (9) is exceeded, the curvature of the surface on the image side of the 21st lens element G21 is too high, which causes spherical aberration to occur. In particular, since the surface on the image side of the 21st lens element G21 is a cemented surface, spherical aberration occurs differently depending on the wavelength.

Condition (10) defines the shape of the positive 24th lens element G24 of the second lens subunit L2b. If a value is less than −1 in condition (10), the 24th lens element G24 has a concave surface on the image side. If the lower limit of condition (10) is not reached, the 24th lens element G24 is a meniscus lens element having a strong convex surface directed toward the object side. This shape increases divergence of the cemented surface of the 24th lens element G24 and results in excessive correction of spherical aberration. If the upper limit of condition (10) is exceeded, the curvature of the cemented surface of the 24th lens element G24 decreases, which causes a problem of insufficient correction of both longitudinal and lateral chromatic aberrations.

Conditions (11) and (12) define the position sensitivity of the third lens unit L3. If the lower limit of condition (11) or (12) is not reached, the position sensitivity of the third lens unit L3, which is a focusing lens unit, is too small. This causes an increase in the amount of movement for focusing and leads to an increased size of a drive unit. If the upper limit of condition (11) or (12) is exceeded, the position sensitivity of the third lens unit L3 is too large. This is undesirable because image plane characteristics greatly vary with distance.

Conditions (13) and (14) define the eccentricity sensitivity of the second lens unit L2. If the lower limit of condition (13) or (14) is not reached, the amount of shift required for the second lens unit L2 to achieve a desired image stabilizing effect is large. This causes an increase in the size of a lens barrel. If the upper limit of condition (13) or (14) is exceeded, the level of performance during image stabilization varies greatly. Since a high-precision control mechanism is required in this case, it is difficult to reduce the size of the camera.

In the exemplary embodiments described above, the numerical ranges defined by conditions (1) to (14) should be set as follows:

$$\nu 1n < 28.8 \tag{1a}$$

$$\nu 2n < 29.5 \tag{2a}$$

$$19 < \nu 1p - \nu 1n < 31 \tag{3a}$$

$$26.1 < \nu 2p - \nu 2n < 35 \tag{4a}$$

$$2.0 < |f1/fw| < 2.4 \tag{5a}$$

$$1.8 < f2/fw < 2.3 \tag{6a}$$

$$2.8 < f3/\sqrt{(fw \cdot fT)} < 3.6 \tag{7a}$$

$$-3.5 < m2/fw < -2.8 \tag{8a}$$

$$-14.0 < (r1\_a + r2\_a)/(r1_{13}a - r2\_a) < -3.0 \tag{9a}$$

$$-0.8 \leq (r1\_b + r2\_b)/(r1\_b - r2\_b) \leq -0.3 \tag{10a}$$

$$0.35 < AW < 0.45 \tag{11a}$$

$$0.31 < AT < 0.40 \tag{12a}$$

$$1.0 < BW < 2.0 \tag{13a}$$

$$2.2 < BT < 2.8 \tag{14a}$$

The upper and lower limits defined by conditions (1a) to (14a) may be used appropriately in combination with those defined by conditions (1) to (14) described above.

Next, numerical examples of the present invention will be described. In each numerical example, "i" represents the order of a surface from the object side, Ri represents the curvature radius of the i-th lens surface, Di represents the lens thickness or space between the i-th surface and the (i+1)-th surface, Ni represents the refractive index to the d-line of the glass material between the i-th lens surface and the (i+1)-th lens surface, and νi represents the Abbe number of the glass material between the i-th lens surface and the (i+1)-th lens surface. Four surfaces closest to the image side are surfaces of filter members, such as a crystal low-pass filter, an infrared cut filter, or the like.

An aspheric shape can be expressed as follows:

$$X = \frac{(1/R)H^2}{1 + \sqrt{1 - (1+K)(H/R)^2}} + BH^4 + CH^6 + DH^8 + EH^{10}$$

where, with respect to a surface vertex, X is a displacement along the optical axis at a height H from the optical axis; R is a paraxial radius of curvature; K is a conic constant; and B, C, D, and E are aspheric coefficients.

Additionally, "e-0X" means "$\times 10^{-X}$", f represents a focal length, Fno represents an F-number, and ω represents a half angle of field. The relationship of the above-described conditions and the numerical examples will be shown in Table 1.

In Numerical Examples 1 to 3, the value of D5 is negative. This is because the F-number determining member SP and the 21st lens element G21 of the second lens unit L2 are counted from the object side. Specifically, as illustrated in FIG. 14, the F-number determining member (aperture stop) SP is arranged closer to the image side by an absolute value of D5 than the vertex G21a is to the image side.

Numerical Example 1
f = 4.71~16.98 Fno = 2.89~5.93 2ω = 74.3°~23.8°

| | | | |
|---|---|---|---|
| *R1 = 33.382 | D1 = 1.35 | N1 = 1.860000 | ν1 = 40.0 |
| *R2 = 4.471 | D2 = 2.37 | | |
| R3 = 8.531 | D3 = 1.55 | N2 = 1.922860 | ν2 = 18.9 |
| R4 = 15.401 | D4 = Variable | | |
| R5 = Stop | D5 = −0.49 | | |
| *R6 = 4.121 | D6 = 1.90 | N3 = 1.766140 | ν3 = 49.1 |
| R7 = 6.575 | D7 = 0.62 | N4 = 1.728250 | ν4 = 28.5 |
| R8 = 3.619 | D8 = 0.51 | | |
| R9 = 8.089 | D9 = 0.50 | N5 = 1.805181 | ν5 = 25.4 |
| R10 = 4.135 | D10 = 2.20 | N6 = 1.620411 | ν6 = 60.3 |
| R11 = −12.553 | D11 = Variable | | |
| R12 = 14.990 | D12 = 1.35 | N7 = 1.622992 | ν7 = 58.2 |
| R13 = 89.039 | D13 = Variable | | |
| R14 = ∞ | D14 = 0.22 | N8 = 1.544270 | ν8 = 70.6 |
| R15 = ∞ | D15 = 0.50 | | |
| R16 = ∞ | D16 = 0.50 | N9 = 1.516330 | ν9 = 64.1 |
| R17 = ∞ | | | |

TABLE 1

| | Focal Length | | |
|---|---|---|---|
| Variable Distance | 4.71 | 10.66 | 16.98 |
| D4 | 12.30 | 3.32 | 0.79 |
| D11 | 3.22 | 10.86 | 19.14 |
| D13 | 4.02 | 3.67 | 2.70 |

Aspheric Coefficients

R1  k=1.73311e+00  B=4.70062e−05  C=1.09574e−06
    D=−1.24880e−08 E=−1.00000e−10

R2  k=−1.78382e+00  B=1.65677e−03  C=−8.71100e−06
    D=5.06153e−07 E=−6.61065e−09

R6  k=−3.13943e−01  B=−1.60250e−04  C=1.59248e−06
    D=0.00000e+00 E=−3.50000e−08

Numerical Example 2
f = 4.72~17.00 Fno = 2.88~5.93 2ω = 74.2°~23.7°

| | | | |
|---|---|---|---|
| *R1 = 35.865 | D1 = 1.35 | N1 = 1.860000 | ν1 = 40.0 |
| *R2 = 4.505 | D2 = 2.33 | | |
| R3 = 8.504 | D3 = 1.55 | N2 = 1.922860 | ν2 = 18.9 |
| R4 = 15.566 | D4 = Variable | | |
| R5 = Stop | D5 = −0.49 | | |
| *R6 = 4.122 | D6 = 1.90 | N3 = 1.766140 | ν3 = 49.1 |
| R7 = 4.831 | D7 = 0.60 | N4 = 1.922860 | ν4 = 18.9 |
| R8 = 3.749 | D8 = 0.51 | | |
| R9 = 8.133 | D9 = 0.50 | N5 = 1.805181 | ν5 = 25.4 |
| R10 = 3.819 | D10 = 2.20 | N6 = 1.638539 | ν6 = 55.4 |
| R11 = −12.209 | D11 = Variable | | |
| R12 = 14.884 | D12 = 1.35 | N7 = 1.622992 | ν7 = 58.2 |
| R13 = 89.039 | D13 = Variable | | |
| R14 = ∞ | D14 = 0.22 | N8 = 1.544270 | ν8 = 70.6 |
| R15 = ∞ | D15 = 0.50 | | |
| R16 = ∞ | D16 = 0.50 | N9 = 1.516330 | ν9 = 64.1 |
| R17 = ∞ | | | |

TABLE 2

| | Focal Length | | |
|---|---|---|---|
| Variable Distance | 4.71 | 10.66 | 16.98 |
| D4 | 12.30 | 3.32 | 0.79 |
| D11 | 3.22 | 10.86 | 19.14 |
| D13 | 4.02 | 3.67 | 2.70 |

Aspheric Coefficients

R1  k=1.73348e+00  B=7.56592e−05  C=2.32097e−06
    D=−7.13685e−08 E=6.30471e−10

R2  k=−1.82298e+00  B=1.71228e−03  C=−4.94715e−06
    D=3.74119e−07 E=−5.32713e−09

R6  k=−3.13943e−01  B=−1.60250e−04  C=1.59248e−06
    D=0.00000e+00 E=−3.50000e−08

Numerical Example 3
f = 4.71~16.96 Fno = 2.88~5.91 2ω = 74.3°~23.8°

| | | | |
|---|---|---|---|
| *R1 = 35.865 | D1 = 1.35 | N1 = 1.860000 | ν1 = 40.0 |
| *R2 = 4.505 | D2 = 2.33 | | |
| R3 = 8.488 | D3 = 1.55 | N2 = 1.922860 | ν2 = 18.9 |
| R4 = 15.480 | D4 = Variable | | |
| R5 = Stop | D5 = −0.49 | | |
| *R6 = 4.122 | D6 = 1.90 | N3 = 1.766140 | ν3 = 49.1 |
| R7 = 6.381 | D7 = 0.60 | N4 = 1.761821 | ν4 = 26.5 |
| R8 = 3.682 | D8 = 0.51 | | |
| R9 = 8.783 | D9 = 0.50 | N5 = 1.721507 | ν5 = 29.2 |
| R10 = 3.401 | D10 = 2.20 | N6 = 1.638539 | ν6 = 55.4 |
| R11 = −13.515 | D11 = Variable | | |
| R12 = 14.873 | D12 = 1.35 | N7 = 1.622992 | ν7 = 58.2 |
| R13 = 89.039 | D13 = Variable | | |
| R14 = ∞ | D14 = 0.22 | N8 = 1.544270 | ν8 = 70.6 |
| R15 = ∞ | D15 = 0.50 | | |
| R16 = ∞ | D16 = 0.50 | N9 = 1.516330 | ν9 = 64.1 |
| R17 = ∞ | | | |

TABLE 3

| | Focal Length | | |
|---|---|---|---|
| Variable Distance | 4.71 | 10.66 | 16.98 |
| D4 | 12.30 | 3.32 | 0.79 |
| D11 | 3.22 | 10.86 | 19.14 |
| D13 | 4.02 | 3.67 | 2.70 |

Aspheric Coefficients

R1  k=1.73348e+00  B=7.56592e−05  C=2.32097e−06
    D=−7.13685e−08 E=6.30471e−10
R2  k=−1.82298e+00 B=1.71228e−03  C=−4.94715e−06
    D=3.74119e−07  E=−5.32713e−09
R6  k=−3.13943e−01 B=−1.60250e−04 C=1.59248e−06
    D=0.00000e+00  E=−3.50000e−08

TABLE 4

|  | First Exemplary Embodiment | Second Exemplary Embodiment | Third Exemplary Embodiment |
| --- | --- | --- | --- |
| Condition (1) | 28.5 | 18.9 | 26.5 |
| Condition (2) | 25.4 | 25.4 | 29.2 |
| Condition (3) | 20.5 | 30.1 | 22.5 |
| Condition (4) | 34.9 | 30.0 | 26.2 |
| Condition (5) | 2.17 | 2.18 | 2.18 |
| Condition (6) | 2.06 | 2.05 | 2.06 |
| Condition (7) | 3.21 | 3.18 | 3.18 |
| Condition (8) | −3.10 | −3.09 | −3.10 |
| Condition (9) | −4.36 | −12.64 | −4.65 |
| Condition (10) | −0.50 | −0.52 | −0.60 |
| Condition (11) | 0.40 | 0.41 | 0.41 |
| Condition (12) | 0.33 | 0.33 | 0.33 |
| Condition (13) | 1.23 | 1.23 | 1.23 |
| Condition (14) | 2.48 | 2.47 | 2.47 |

In the exemplary embodiments described above, the first lens unit includes two lens elements. However, the first lens unit may include one (negative) lens element only. In other words, the number of lens elements constituting the first lens unit should be less than or equal to two. At the same time, the second lens unit should include at least one aspheric surface. Additionally, the first, second, and third lens units should perform zooming by moving such that distances between the lens units (i.e., a distance between the first lens unit and the second lens unit, and a distance between the second lens unit and the third lens unit) are varied.

Thus, according to at least one exemplary embodiment of the present invention, a zoom lens (imaging optical system) that is compact and capable of providing high optical performance throughout the entire zoom range can be achieved.

Next, an exemplary digital still camera (image pickup apparatus) using a zoom lens of at least one exemplary embodiment of the present invention as an imaging optical system will be described with reference to FIG. 13.

Referring to FIG. 13, the digital still camera includes a camera body 20, an imaging optical system 21, a solid-state image pickup element (photoelectric conversion element) 22, a memory 23, and a finder 24. The imaging optical system 21 is a zoom lens according to at least one exemplary embodiment of the present invention. The solid-state image pickup element 22, such as a CCD sensor or a CMOS sensor, is included in the camera body 20, detects a subject image formed by the imaging optical system 21, and photoelectrically converts the detected subject image into information, which is recorded in the memory 23. The finder 24, such as a liquid crystal display panel, allows observation of the subject image formed on the solid-state image pickup element 22.

Thus, by applying a zoom lens of at least one exemplary embodiment of the present invention to an image pickup apparatus, such as a digital still camera, a compact image pickup apparatus capable of providing high optical performance throughout the entire zoom range can be achieved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-247835 filed Sep. 13, 2006, which is hereby incorporated by reference herein in its entirety.

What is claimed is:

1. A zoom lens comprising, in order from an object side to an image side:
   a first lens unit having negative refractive power and including two lens elements or less;
   a second lens unit having positive refractive power; and
   a third lens unit having positive refractive power,
   wherein the zoom lens performs zooming by varying a distance between the first lens unit and the second lens unit and a distance between the second lens unit and the third lens unit;
   the second lens unit comprises:
      a first lens subunit including a positive lens element and a negative lens element; and
      a second lens subunit arranged on the image side of the first lens subunit and including a positive lens element and a negative lens element; and
   the following conditions are satisfied:

$v1n < 29,$ $v2n < 30,$ $18 < v1p - v1n < 35,$ and $26 < v2p - v2n < 35,$ where v1p and v1n respectively represent Abbe numbers of materials of the positive lens element and the negative lens element of the first lens subunit, and v2p and v2n respectively represent Abbe numbers of materials of the positive lens element and the negative lens element of the second lens subunit.

2. The zoom lens according to claim 1, wherein the following condition is satisfied:

$1.5 < |f1/fw| < 2.5,$ where f1 is a focal length of the first lens unit and fw is a focal length of the entire zoom lens system at a wide-angle end.

3. The zoom lens according to claim 1, wherein the following condition is satisfied:

$1.5 < f2/fw < 2.5,$ where f2 is a focal length of the second lens unit and fw is a focal length of the entire zoom lens system at a wide-angle end.

4. The zoom lens according to claim 1, wherein the following condition is satisfied:

$2.5 < f3/\sqrt{(fw \cdot fT)} < 4.0,$ where f3 is a focal length of the third lens unit and fw and fT are focal lengths of the entire zoom lens system at a wide-angle end and a telephoto end, respectively.

5. The zoom lens according to claim 1, wherein the following condition is satisfied:

$-4.0 < m2/fw < -2.5,$ where m2 is the amount of movement of the second lens unit along an optical axis toward the image side during magnification change from a wide-angle end to a telephoto end and fw is a focal length of the entire zoom lens system at a wide-angle end.

6. The zoom lens according to claim 1, wherein the following condition is satisfied:

$$-15 < (r1\_a + r2\_a)/(r1\_a - r2\_a) < 0,$$

where the positive lens element and the negative lens element of the first lens subunit are arranged in order from the object side to the image side, r1_a is a curvature radius of a surface on the object side of the positive lens element, and r2_a is a curvature radius of a surface on the image side of the positive lens element.

7. The zoom lens according to claim 1, wherein the following condition is satisfied:

$$-1 \leq (r1\_b + r2\_b)/(r1\_b - r2\_b) \leq 0,$$

where the negative lens element and the positive lens element of the second lens subunit are arranged in order from the object side to the image side, r1_b is a curvature radius of a surface on the object side of the positive lens element, and r2_b is a curvature radius of a surface on the image side of the positive lens element.

8. The zoom lens according to claim 1, wherein the following conditions are satisfied:

$$0.3 < AW < 0.5, \text{ and}$$

$$0.2 < AT < 0.4,$$

where AW and AT are position sensitivities of the third lens unit at a wide-angle end and a telephoto end, respectively, and can be expressed as:

$$AW = 1 - \beta 3w^2, \text{ and}$$

$$AT = 1 - \beta 3T^2,$$

where $\beta 3w$ and $\beta 3T$ are lateral magnifications of the third lens unit at the wide-angle end and the telephoto end, respectively.

9. The zoom lens according to claim 1, wherein the following conditions are satisfied:

$$0.5 < BW < 2.5, \text{ and}$$

$$2.0 < BT < 3.0,$$

where BW and BT are eccentricity sensitivities of the second lens unit at a wide-angle end and a telephoto end, respectively, and can be expressed as:

$$BW = (1 - \beta 2w) \times \beta 3w, \text{ and}$$

$$BT = (1 - \beta 2T) \times \beta 3T$$

where $\beta 2w$ and $\beta 2T$ are lateral magnifications of the second lens unit at the wide-angle end and the telephoto end, respectively, and $\beta 3w$ and $\beta 3T$ are lateral magnifications of the third lens unit at the wide-angle end and the telephoto end, respectively.

10. The zoom lens according to claim 1, wherein during zooming from a wide-angle end to a telephoto end, the first lens unit moves in a locus convex toward the image side, the second lens unit monotonously moves toward the object side, and the third lens unit moves toward the image side.

11. The zoom lens according to claim 1, wherein at least one negative lens element of the first lens unit has aspheric surfaces on the object side and the image side.

12. The zoom lens according to claim 1, wherein the third lens unit moves toward the object side for focusing from an object at infinity to an object at a close distance.

13. An image pickup apparatus comprising:
a solid-state image pickup element; and
a zoom lens configured to form an object image on the solid-state image pickup element,
wherein, in order from an object side to an image side, the zoom lens comprises:
a first lens unit having negative refractive power and including two lens elements or less;
a second lens unit having positive refractive power; and
a third lens unit having positive refractive power,
wherein the zoom lens performs zooming by varying a distance between the first lens unit and the second lens unit and a distance between the second lens unit and the third lens unit;
the second lens unit comprises:
a first lens subunit including a positive lens element and a negative lens element, and
a second lens subunit arranged on the image side of the first lens subunit and including a positive lens element and a negative lens element; and
the following conditions are satisfied:

$$v1n < 29,$$

$$v2n < 30,$$

$$18 < v1p - v1n < 35, \text{ and}$$

$$26 < v2p - v2n < 35,$$

where v1p and v1n respectively represent Abbe numbers of materials of the positive lens element and the negative lens element of the first lens subunit, and v2p and v2n respectively represent Abbe numbers of materials of the positive lens element and the negative lens element of the second lens subunit.

14. A zoom lens comprising, in order from an object side to an image side:
a first lens unit having negative refractive power and including two lens elements or less;
a second lens unit having positive refractive power and including an aspheric surface; and
a third lens unit having positive refractive power,
wherein the zoom lens performs zooming by varying a distance between the first lens unit and the second lens unit and a distance between the second lens unit and the third lens unit;
the second lens unit comprises:
a first lens subunit including a positive lens element and a negative lens element, and
a second lens subunit arranged on the image side of the first lens subunit and including a positive lens element and a negative lens element; and
the following conditions are satisfied:

$$v1n < 29,$$

$$v2n < 30,$$

$$18 < v1p - v1n < 35, \text{ and}$$

$$26 < v2p - v2n < 35,$$

where v1p and v1n respectively represent Abbe numbers of materials of the positive lens element and the negative lens element of the first lens subunit, and v2p and v2n respectively represent Abbe numbers of materials of the positive lens element and the negative lens element of the second lens subunit.

15. An image pickup apparatus comprising:
a solid-state image pickup element; and
a zoom lens configured to form an object image on the solid-state image pickup element, wherein, in order from an object side to an image side, the zoom lens comprises:

a first lens unit having negative refractive power and including two lens elements or less;

a second lens unit having positive refractive power and including an aspheric surface; and a third lens unit having positive refractive power, wherein the zoom lens performs zooming by varying a distance between the first lens unit and the second lens unit and a distance between the second lens unit and the third lens unit;

the second lens unit comprises:
a first lens subunit including a positive lens element and a negative lens element, and
a second lens subunit arranged on the image side of the first lens subunit and including a positive lens element and a negative lens element; and the following conditions are satisfied:

$$v1n<29,$$

$$v2n<30,$$

$$18<v1p-v1n<35, \text{ and}$$

$$26<v2p-v2n<35,$$

where v1p and v1n respectively represent Abbe numbers of materials of the positive lens element and the negative lens element of the first lens subunit, and v2p and v2n respectively represent Abbe numbers of materials of the positive lens element and the negative lens element of the second lens subunit.

16. A zoom lens comprising, in order from an object side to an image side:

a first lens unit having negative refractive power and including two lens elements or less;

a second lens unit having positive refractive power; and a third lens unit having positive refractive power, wherein the first, second, and third lens units are moved during zooming to vary a distance between the first lens unit and the second lens unit and a distance between the second lens unit and the third lens unit;

the second lens unit comprises:
a first lens subunit including a positive lens element and a negative lens element, and
a second lens subunit arranged on the image side of the first lens subunit and including a positive lens element and a negative lens element; and the following conditions are satisfied:

$$v1n<29,$$

$$v2n<30,$$

$$18<v1p-v1n<35, \text{ and}$$

$$26<v2p-v2n<35,$$

where v1p and v1n respectively represent Abbe numbers of materials of the positive lens element and the negative lens element of the first lens subunit, and v2p and v2n respectively represent Abbe numbers of materials of the positive lens element and the negative lens element of the second lens subunit.

17. An image pickup apparatus comprising:
a solid-state image pickup element; and
a zoom lens configured to form an object image on the solid-state image pickup element, wherein, in order from an object side to an image side, the zoom lens comprises:

a first lens unit having negative refractive power and including two lens elements or less;

a second lens unit having positive refractive power; and a third lens unit having positive refractive power, wherein the first, second, and third lens units are moved during zooming to vary a distance between the first lens unit and the second lens unit and a distance between the second lens unit and the third lens unit;

the second lens unit comprises:
a first lens subunit including a positive lens element and a negative lens element, and
a second lens subunit arranged on the image side of the first lens subunit and including a positive lens element and a negative lens element; and the following conditions are satisfied:

$$v1n<29,$$

$$v2n<30,$$

$$18<v1p-v1n<35, \text{ and}$$

$$26<v2p-v2n<35,$$

where v1p and v1n respectively represent Abbe numbers of materials of the positive lens element and the negative lens element of the first lens subunit, and v2p and v2n respectively represent Abbe numbers of materials of the positive lens element and the negative lens element of the second lens subunit.

18. A zoom lens comprising, in order from an object side to an image side:

a first lens unit having negative refractive power and including two lens elements or less;

a second lens unit having positive refractive power; and a third lens unit having positive refractive power, wherein the zoom lens performs zooming by varying a distance between the first lens unit and the second lens unit and a distance between the second lens unit and the third lens unit;

the second lens unit comprises:
a first lens subunit including a positive lens element and a negative lens element; and
a second lens subunit arranged on the image side of the first lens subunit and including a positive lens element and a negative lens element; and the following conditions are satisfied:

$$v1n<29,$$

$$v2n<30,$$

$$18<v1p-v1n<35,$$

$$26<v2p-v2n<35, \text{ and}$$

$$2.5<f3/\sqrt{(fw \cdot fT)}<4.0,$$

where v1p and v1n respectively represent Abbe numbers of materials of the positive lens element and the negative lens element of the first lens subunit, v2p and v2n respectively represent Abbe numbers of materials of the positive lens element and the negative lens element of the second lens subunit, f3 represents a focal length of the third lens unit, and fw and fT respectively represent focal lengths of the entire zoom lens system at a wide-angle end and a telephoto end.

19. An image pickup apparatus comprising:
a solid-state image pickup element; and
a zoom lens configured to form an object image on the solid-state image pickup element,
wherein, in order from an object side to an image side, the zoom lens comprises:
a first lens unit having negative refractive power and including two lens elements or less;
a second lens unit having positive refractive power; and
a third lens unit having positive refractive power,
wherein the zoom lens performs zooming by varying a distance between the first lens unit and the second lens unit and a distance between the second lens unit and the third lens unit;
the second lens unit comprises:
a first lens subunit including a positive lens element and a negative lens element; and
a second lens subunit arranged on the image side of the first lens subunit and including a positive lens element and a negative lens element; and
the following conditions are satisfied:

$v1n<29,$ $v2n<30,$ $18<v1p-v1n<35,$ $26<v2p-v2n<35,$ and $2.5<f3/\sqrt{(fw \cdot fT)}<4.0,$ where $v1p$ and $v1n$ respectively represent Abbe numbers of materials of the positive lens element and the negative lens element of the first lens subunit, $v2p$ and $v2n$ respectively represent Abbe numbers of materials of the positive lens element and the negative lens element of the second lens subunit, $f3$ represents a focal length of the third lens unit, and $fw$ and $fT$ respectively represent focal lengths of the entire zoom lens system at a wide-angle end and a telephoto end.

20. A zoom lens comprising, in order from an object side to an image side:
a first lens unit having negative refractive power and including two lens elements or less;
a second lens unit having positive refractive power; and
a third lens unit having positive refractive power,
wherein the zoom lens performs zooming by varying a distance between the first lens unit and the second lens unit and a distance between the second lens unit and the third lens unit;
the second lens unit comprises:
a first lens subunit including a positive lens element and a negative lens element that are arranged in order from the object side to the image side; and
a second lens subunit arranged on the image side of the first lens subunit and including a positive lens element and a negative lens element; and
the following conditions are satisfied:

$v1n<29,$ $v2n<30,$ $18<v1p-v1n<35,$ $26<v2p-v2n<35,$ and $-15<(r1\_a+r2\_a)/(r1\_a-r2\_a)<0,$ where $v1p$ and $v1n$ respectively represent Abbe numbers of materials of the positive lens element and the negative lens element of the first lens subunit, $v2p$ and $v2n$ respectively represent Abbe numbers of materials of the positive lens element and the negative lens element of the second lens subunit, $r1\_a$ represents a curvature radius of a surface on the object side of the positive lens element, and $r2\_a$ represents a curvature radius of a surface on the image side of the positive lens element.

21. An image pickup apparatus comprising:
a solid-state image pickup element; and
a zoom lens configured to form an object image on the solid-state image pickup element,
wherein, in order from an object side to an image side, the zoom lens comprises:
a first lens unit having negative refractive power and including two lens elements or less;
a second lens unit having positive refractive power; and
a third lens unit having positive refractive power,
wherein the zoom lens performs zooming by varying a distance between the first lens unit and the second lens unit and a distance between the second lens unit and the third lens unit;
the second lens unit comprises:
a first lens subunit including a positive lens element and a negative lens element that are arranged in order from the object side to the image side; and
a second lens subunit arranged on the image side of the first lens subunit and including a positive lens element and a negative lens element; and
the following conditions are satisfied:

$v1n<29,$ $v2n<30,$ $18<v1p-v1n<35,$ $26<v2p-v2n<35,$ and $-15<(r1\_a+r2\_a)/(r1\_a-r2\_a)<0,$ where $v1p$ and $v1n$ respectively represent Abbe numbers of materials of the positive lens element and the negative lens element of the first lens subunit, $v2p$ and $v2n$ respectively represent Abbe numbers of materials of the positive lens element and the negative lens element of the second lens subunit, $r1\_a$ represents a curvature radius of a surface on the object side of the positive lens element, and $r2\_a$ represents a curvature radius of a surface on the image side of the positive lens element.

22. A zoom lens comprising, in order from an object side to an image side:
a first lens unit having negative refractive power and including two lens elements or less;
a second lens unit having positive refractive power; and
a third lens unit having positive refractive power,
wherein the zoom lens performs zooming by varying a distance between the first lens unit and the second lens unit and a distance between the second lens unit and the third lens unit;
the second lens unit comprises:
a first lens subunit including a positive lens element and a negative lens element that are arranged in order from the object side to the image side; and a second lens subunit arranged on the image side of the first lens subunit and including a positive lens element and a negative lens element; and the following conditions are satisfied:

$\nu 1n < 29,$ $\nu 2n < 30,$ $18 < \nu 1p - \nu 1n < 35,$ $26 < \nu 2p - \nu 2n < 35,$ $0.5 < BW < 2.5,$ and $2.0 < BT < 3.0,$ where $\nu 1p$ and $\nu 1n$ respectively represent Abbe numbers of materials of the positive lens element and the negative lens element of the first lens subunit, $\nu 2p$ and $\nu 2n$ respectively represent Abbe numbers of materials of the positive lens element and the negative lens element of the second lens subunit, and BW and BT respectively represent eccentricity sensitivities of the second lens unit at a wide-angle end and a telephoto end and can be expressed as:

$BW = (1 - \beta 2w) \times \beta 3w,$ and $BT = (1 - \beta 2T) \times \beta 3T$ where $\beta 2w$ and $\beta 2T$ respectively represent lateral magnifications of the second lens unit at the wide-angle end and the telephoto end, and $\beta 3w$ and $\beta 3T$ respectively represent lateral magnifications of the third lens unit at the wide-angle end and the telephoto end.

23. An image pickup apparatus comprising:

a solid-state image pickup element; and a zoom lens configured to form an object image on the solid-state image pickup element, wherein, in order from an object side to an image side, the zoom lens comprises:

a first lens unit having negative refractive power and including two lens elements or less;

a second lens unit having positive refractive power; and a third lens unit having positive refractive power, wherein the zoom lens performs zooming by varying a distance between the first lens unit and the second lens unit and a distance between the second lens unit and the third lens unit;

the second lens unit comprises:

a first lens subunit including a positive lens element and a negative lens element that are arranged in order from the object side to the image side; and a second lens subunit arranged on the image side of the first lens subunit and including a positive lens element and a negative lens element; and the following conditions are satisfied:

$\nu 1n < 29,$ $\nu 2n < 30,$ $18 < \nu 1p - \nu 1n < 35,$ $26 < \nu 2p - \nu 2n < 35,$ $0.5 < BW < 2.5,$ and $2.0 < BT < 3.0,$ where $\nu 1p$ and $\nu 1n$ respectively represent Abbe numbers of materials of the positive lens element and the negative lens element of the first lens subunit, $\nu 2p$ and $\nu 2n$ respectively represent Abbe numbers of materials of the positive lens element and the negative lens element of the second lens subunit, and BW and BT respectively represent eccentricity sensitivities of the second lens unit at a wide-angle end and a telephoto end and can be expressed as:

$BW = (1 - \beta 2w) \times \beta 3w,$ and $BT = (1 - \beta 2T) \times \beta 3T$ where $\beta 2w$ and $\beta 2T$ respectively represent lateral magnifications of the second lens unit at the wide-angle end and the telephoto end, and $\beta 3w$ and $\beta 3T$ respectively represent lateral magnifications of the third lens unit at the wide-angle end and the telephoto end.

* * * * *